(12) United States Patent
Smith et al.

(10) Patent No.: US 11,104,531 B1
(45) Date of Patent: *Aug. 31, 2021

(54) SILICA DUST CONTROLS FOR HYDRAULIC FRACTURING OPERATIONS

(71) Applicant: Sierra Dust Control LLC, Tatum, TX (US)

(72) Inventors: Kim R. Smith, Tatum, TX (US); Cody Baker, Tatum, TX (US)

(73) Assignee: SIERRA DUST CONTROL, LLC, Tatum, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,871

(22) Filed: Dec. 11, 2018

Related U.S. Application Data

(60) Continuation of application No. 15/164,577, filed on May 25, 2016, which is a continuation-in-part of application No. 14/862,354, filed on Sep. 23, 2015, now Pat. No. 9,630,223, which is a continuation of application No. 14/527,868, filed on Oct. 30, 2014, now Pat. No. 9,168,482, which is a division of application No. 14/178,782, filed on Feb. 12, 2014, now Pat. No. 8,881,749, which is a continuation of application No. 13/769,456, filed on Feb. 18, 2013, now Pat. No. 9,162,261.

(60) Provisional application No. 62/291,419, filed on Feb. 4, 2016.

(51) Int. Cl.
*B65G 69/18* (2006.01)
*B65G 67/24* (2006.01)
*E21B 43/267* (2006.01)
*B08B 15/00* (2006.01)

(52) U.S. Cl.
CPC .......... *B65G 69/186* (2013.01); *B08B 15/002* (2013.01); *B65G 67/24* (2013.01); *E21B 43/267* (2013.01); *B65G 2814/0326* (2013.01)

(58) Field of Classification Search
CPC .. B65G 69/181; B65G 69/182; B65G 69/183; B65G 69/185; B65G 69/186; B65G 69/187; B65G 69/188
See application file for complete search history.

(56) References Cited

U.S. PATENT DOCUMENTS

| | | | |
|---|---|---|---|
| 4,787,179 A * | 11/1988 | Lewis | B24C 9/00 451/87 |
| 5,183,086 A | 2/1993 | Fanta et al. | |
| 6,302,265 B1 * | 10/2001 | Cunningham | B65G 21/14 198/313 |
| 2012/0247335 A1 | 10/2012 | Stutzman et al. | |
| 2013/0309052 A1 | 11/2013 | Luharuka et al. | |

* cited by examiner

*Primary Examiner* — Mikhail Kornakov
*Assistant Examiner* — Ryan L. Coleman

(57) ABSTRACT

A system for controlling dust during hydraulic fracturing operations includes a manifold having a plurality of ports for capturing dust when negative air pressure is applied to the manifold. A support frame positions the manifold above a piece of hydraulic fracturing equipment receiving sand from a sand source.

10 Claims, 29 Drawing Sheets

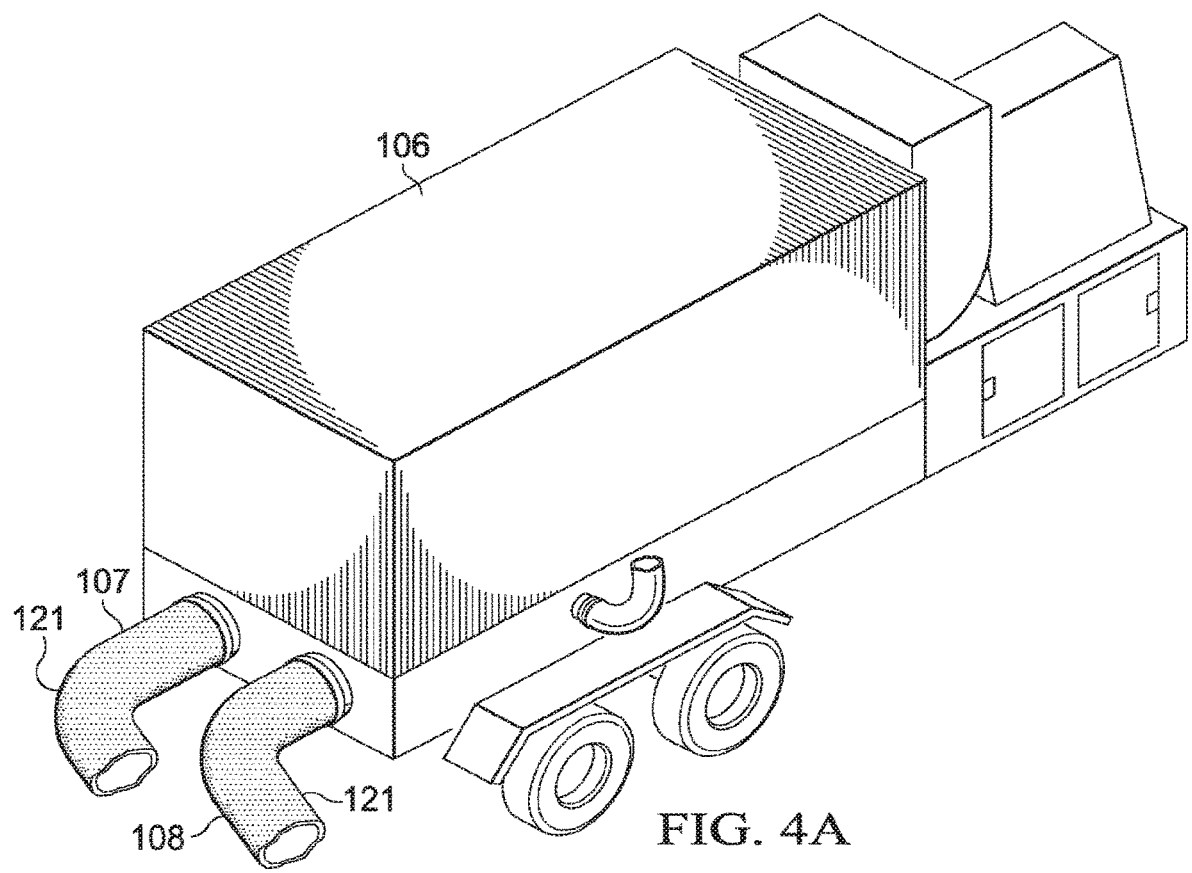

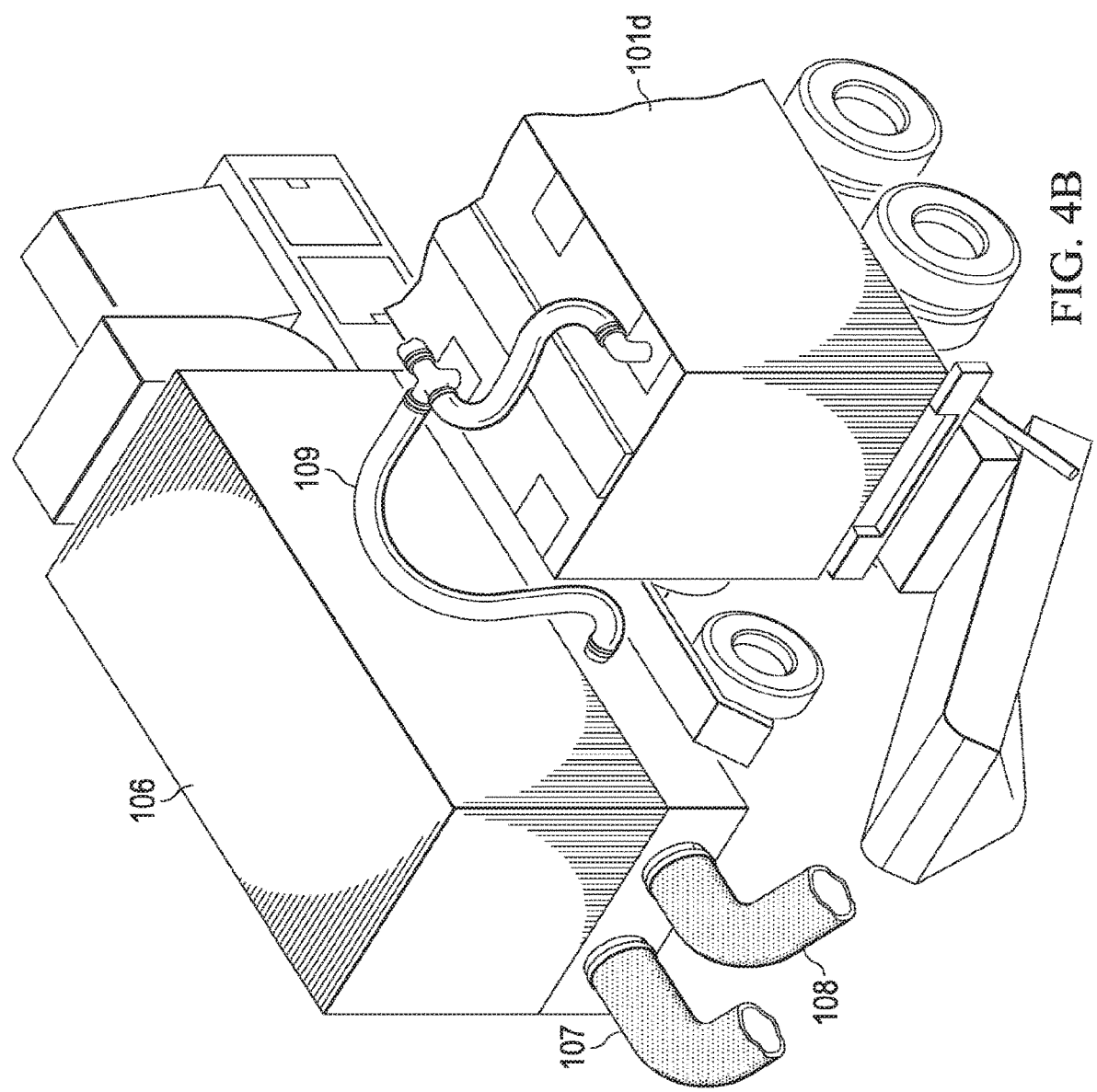

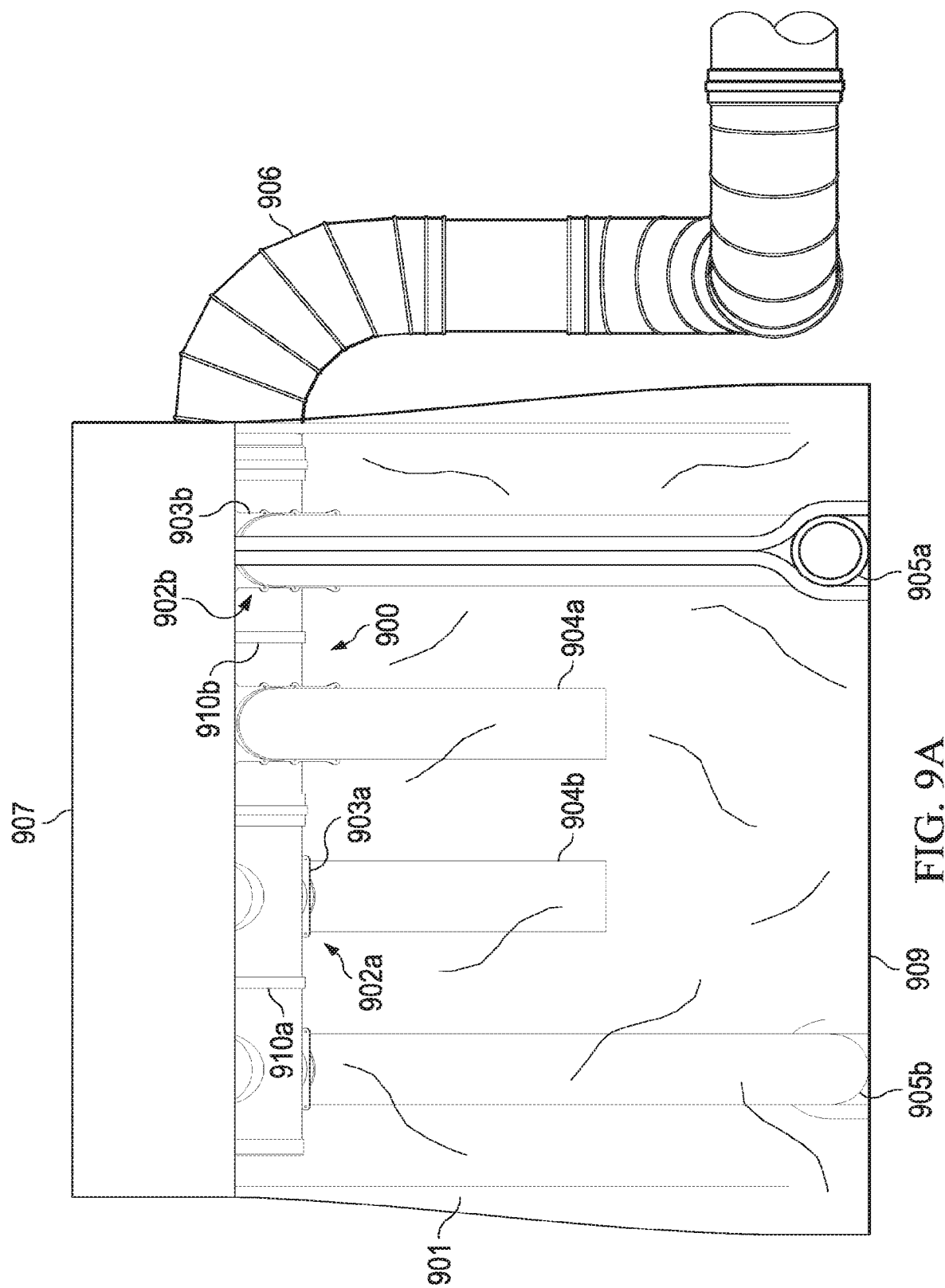

SILICA DUST CONTROLS FOR HYDRAULIC FRACTURING OPERATIONS

CROSS-REFERENCE TO RELATED APPLICATION

The present application is a continuation of U.S. patent application Ser. No. 15/164,577, filed May 25, 2016, which is a continuation-in-part of U.S. patent Ser. No. 14/862,354, filed Sep. 23, 2015, which is a continuation of application Ser. No. 14/527,868, filed Oct. 30, 2014, which is a divisional of U.S. patent application Ser. No. 14/178,782, filed Feb. 12, 2014, which is a continuation of U.S. patent application Ser. No. 13/769,456, filed Feb. 18, 2013, all of which are incorporated herein by reference for all purposes.

FIELD OF INVENTION

The present invention relates in general to hydraulic fracturing, and in particular to systems and methods for controlling silica dust during the handling of frac sand.

BACKGROUND OF INVENTION

Hydraulic fracturing ("fracing") is a well known technique for releasing oil and natural gas from underground reservoirs within rock formations having a limited permeability. For example, fracing is often used to release oil and natural gas, such as natural gas or oil, from shale formations.

Fracing is a well completion technique performed after the drilling of the wellbore, which in the case of releasing natural gas from shale, is commonly a horizontal wellbore, although occasionally the wellbore is vertical. Fracing fluid, which is primarily water and chemicals that form a viscous gel, is pumped into the well to create fractures within the surrounding rock. The viscous gel carries a "proppant" into the fractures, such that when the pumping stops, the fractures remain substantially open and allow the oil and natural gas to escape into the wellbore.

One typical proppant is "frac sand." Frac sand is normally high purity silica sand with grains having a size and shape capable of resisting the crushing forces applied during the closing of the fractures when the hydraulic force provided by the pumping is removed. However, given that frac sand contains a high proportion of silica, the loading, transportation, and unloading of frac sand presents significant safety challenges.

The United States Occupational Safety and Health Administration ("OSHA") lists silica as a carcinogen. In particular, the exposure and inhalation of silica dust has been linked to silicosis, which is an irreversible lung disorder characterized by inflammation and scarring of the upper lobes of the lungs. The best, and perhaps only way, to reduce or eliminate the threat of silicosis is to carefully control worker exposure to silica dust.

OSHA lists a number of different ways to limit worker exposure to silica dust, including limiting worker time at a worksite, limiting the number of workers at a worksite, watering roads and other worksite areas, enclosing points where silica dust is released, and requiring workers to wear respirators. These techniques do not, at least on their own, provide a complete solution to the problem of controlling silica dust. Furthermore, these existing techniques, while commendable, are nonetheless burdensome, time-consuming, inefficient, and impractical.

SUMMARY OF INVENTION

One representative embodiment of the principles of the present invention is a system for controlling dust during hydraulic fracturing operations, which includes a manifold having a plurality of ports for capturing dust when negative air pressure is applied to the manifold. A support structure positions the manifold above a piece of hydraulic fracturing equipment receiving sand from a frac sand source.

Another representative embodiment is a system for controlling dust during hydraulic fracturing operations, which includes a support structure and a manifold positioned by the support structure above a piece of frac sand handling equipment receiving frac sand from a frac sand source. An enclosure supported by the support structure encloses at least a portion of the piece of frac sand handling equipment. At least one conduit in fluid communication with the manifold has an inlet for capturing dust contained within the enclosure when negative air pressure is applied to the manifold.

A further exemplary embodiment of the present principles is a frac sand handling system including frac sand handling equipment, and a support structure. An enclosure is supported by the support structure and encloses at least a portion of the frac sand handling equipment including a point at which frac sand is received by the frac sand handling equipment. A manifold is positioned by the support structure above the frac sand handling equipment. The manifold includes a plurality of ports for capturing dust when negative air pressure is applied to the manifold, with at least one of the ports adapted to capture dust generated around the point at which frac sand is received by the frac sand handling equipment.

The present inventive principles advantageously provide for efficient and flexible systems and methods for collecting the silica dust generated during the offload of frac sand from a frac sand source, such as a sand transport and storage trailer, a vertical sand mover, or one or more containers positioned directly above the lateral conveyor. Among other things, by positioning the manifold above the lateral handling equipment (e.g., blender bin and/or tub, t-belt, or dragon tail) the overall profile of the enclosure and manifold system becomes more compact. As a result, the amount of dust control system equipment on or near the ground can be reduced, which reduces tripping hazards, reduces clutter, and increases accessibility to both the dust control system and the associated frac sand handling equipment.

The manifold, support structure, and enclosure can be configured to control dust generated in and around various pieces of frac sand handling equipment such as lateral conveyors (t-belts), angled lifting conveyors (dragon tails), and blenders, as well as different combinations of those pieces of equipment.

The support structure allows the manifold to either be suspended from the support structure using a cable or strap or supported at a point on the support structure itself. The support structure may be free-standing such that other equipment within the frac sand handling and dust control system can be moved or reconfigured without the need to move or reconfigure the manifold, support structure, and/or enclosure.

The support structure also allows the manifold to be positioned inside or outside of the enclosure that contains dust generated during operation of the frac sand handling equipment. In embodiments in which the manifold is positioned inside the enclosure, air flow into the manifold can be achieved through a simple aperture through the manifold wall, through a fitting adapted to connect with a flexible conduit, with or without the flexible conduit attached, or through an extended fitting or rigid conduit.

The application of these principles improves the efficiency and flexibility of the frac sand offloading process by allowing increased worker time at the worksite and/or for more workers to be present at the worksite at one time, reducing the need for watering of worksite areas and the enclosure of points where silica dust is released, reducing the need for respirator wear, and decreasing the amount of silica dust intake by the engines of nearby vehicles and equipment.

BRIEF DESCRIPTION OF DRAWINGS

For a more complete understanding of the present invention, and the advantages thereof, reference is now made to the following descriptions taken in conjunction with the accompanying drawings, in which:

FIG. 4A is a diagram showing in further detail the pneumatic connections between the inlets of the silica dust control unit and the manifolds of FIG. 1;

FIG. 4B is a diagram showing in further detail the direct airflow path between the silica dust control unit and the silica dust control conduit subsystem servicing one selected trailer of FIG. 1;

FIG. 9A is a side elevational view diagram of another alternative raised manifold and enclosure system according to the inventive principles and suitable for containing dust generated in and around a blender bin, blender tub, or both, in a dust control system such as that shown in FIG. 1;

DETAILED DESCRIPTION OF THE INVENTION

The principles of the present invention and their advantages are best understood by referring to the illustrated embodiment depicted in FIGS. 1-9 of the drawings, in which like numbers designate like parts.

Figure 1:
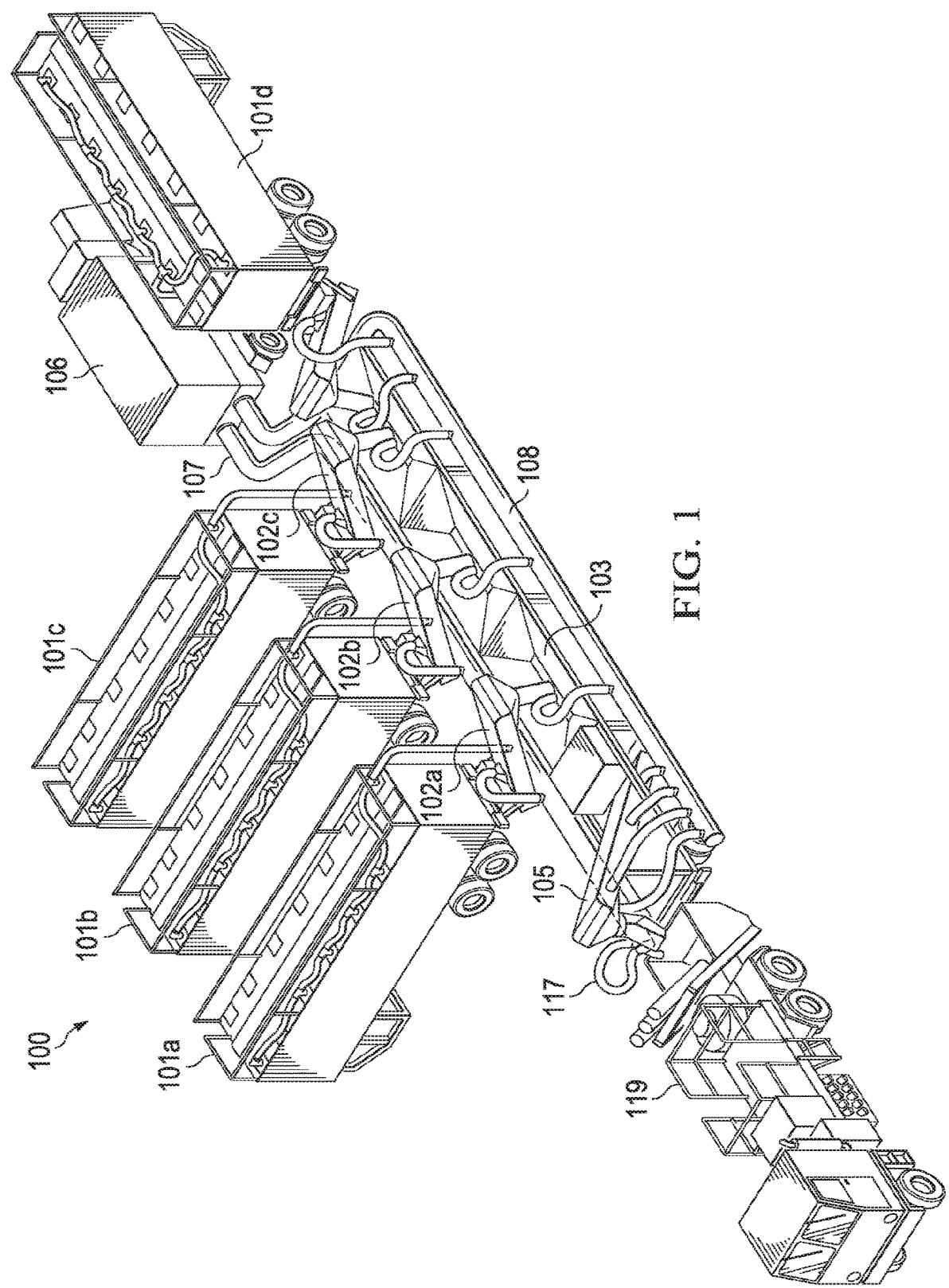
FIG. 1 is a perspective diagram of a representative frac sand transportation and unloading system including a frac sand silica dust control system according to a preferred embodiment of the principles of the present invention.

FIG. 1 is a diagram of an exemplary frac sand transportation, storage, and unloading system 100 including a frac sand silica dust control system according to a preferred embodiment of the principles of the present invention. System 100 is also shown in the plan views of FIGS. 2 and 3, with FIG. 2 emphasizing the air flow paths of the silica dust control system and FIG. 3 generally showing the locations of particular features of the silica dust control system shown in further detail in FIGS. 4-6.

Generally, system 100 is assembled at a hydraulic fracturing worksite and is used to offload frac sand transported to the worksite from a frac sand supplier via trailers and offloaded into a blender. The blender mixes the sand with the water and chemicals to form the fracing fluid. Given the significantly large amounts of frac sand that are typically required during typical hydraulic fracturing operations, a substantial amount of potentially hazardous silica dust is commonly generated during conventional trailer offloading operations. The principles of the present invention advantageously provide for the control of frac sand produced silica dust, which consequently improves personnel safety, helps reduce the need for respirators and other burdensome safety equipment, and allows personnel to work longer and more efficiently at the worksite.

Figure 2:
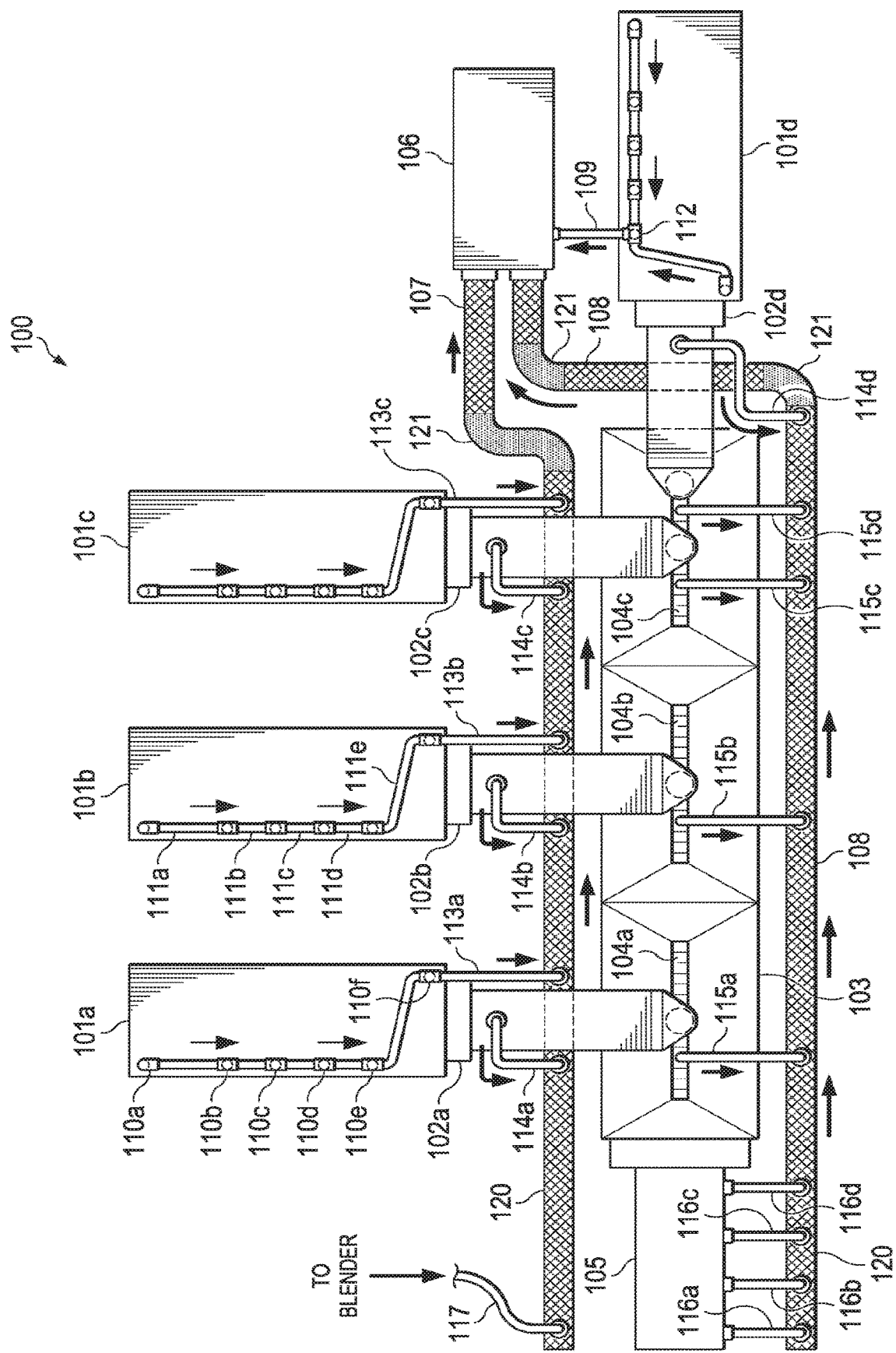
FIG. 2 is a plan view diagram of the frac sand transportation and unloading system of FIG. 1, which emphasizes the airflow paths through the frac sand silica dust control system.
Figure 3:
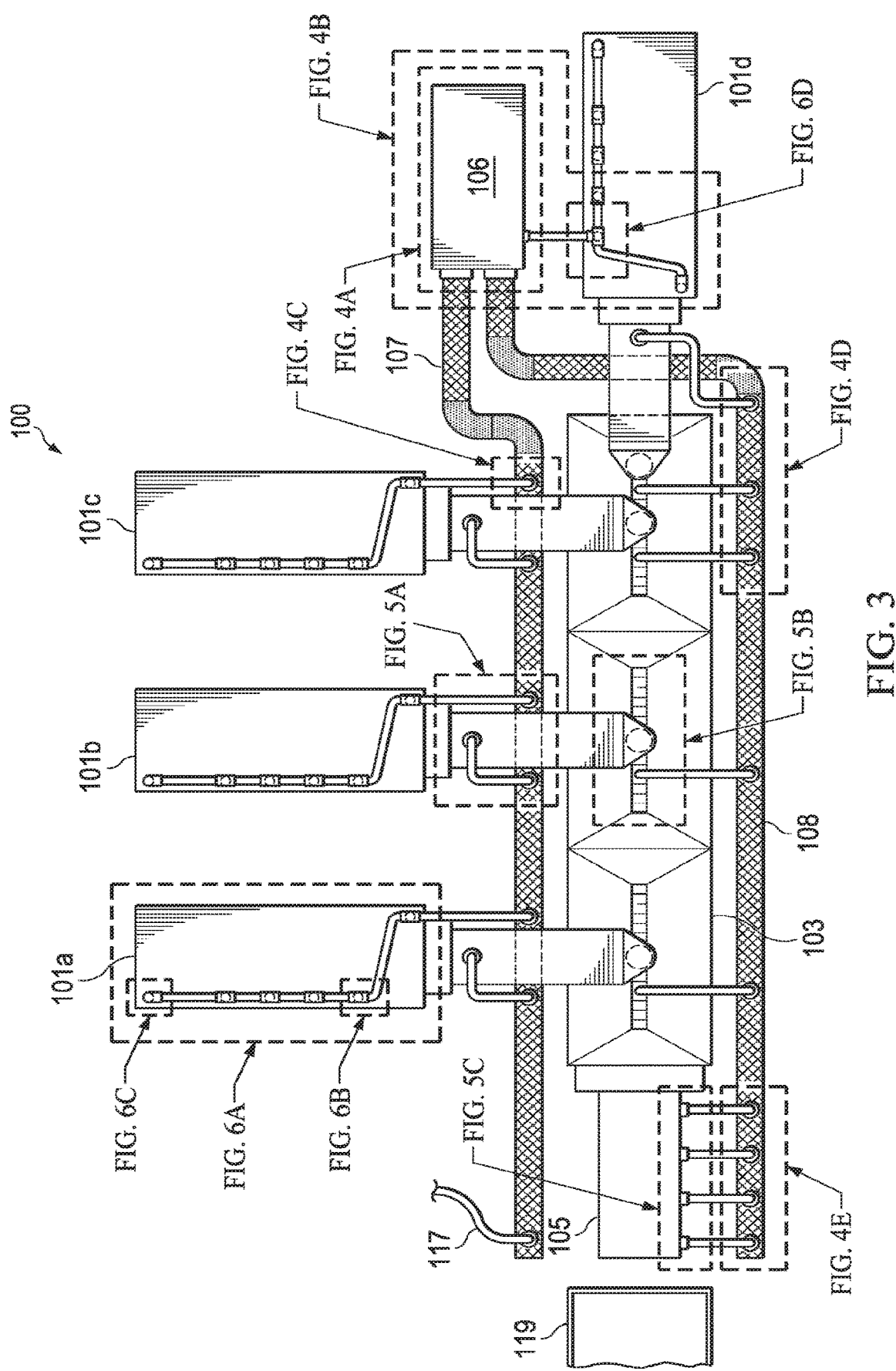
FIG. 3 is a plan view diagram of the frac sand transportation and unloading system of FIG. 1, which generally indicates the locations of particular structures of the frac sand silica dust control subsystem shown in more detail in FIGS. 4-6.

In the illustrated embodiment of system 100 shown in FIGS. 1, 2, and 3, four (4) conventional sand storage trailers 101a-101d are shown at a fracing worksite. While four (4) trailers 101 are shown as an example, the actual number of sand storage trailers 101 utilized in any particular embodiment or configuration of system 100 may vary based on the needs and restrictions at the worksite. The size and configuration of system 100 in any given worksite application will depend on such factors as the amount of sand that must be offloaded, the speed at which sand must be offloaded, and the size and capabilities of the offloading conveyor system. In the illustrated embodiment of system 100, each trailer 101 includes a retractable trailer discharge conveyor (transfer belt) 102a-102d, which receives sand from the compartments of the trailer internal tank via a lateral transfer belt running underneath the trailer tank (not shown). Trailers 101 are, for example, Sand King 3000/4000 frac sand trailers from Convey-All Industries, Inc., although there are a number of other commercially available sand storage trailers known in the art. It should also be recognized that the principles of the present invention are also applicable to embodiments of system 100 in which sand is stored and discharged from other types of fixed and transportable storage systems, such as tanks, silos, compartmented vehicles, and so on.

Each trailer discharge conveyor 102a-102d discharges sand to a conventional transportable conveyor system, for example, Unibelt conveyor system from Convey-All Industries, Inc., which includes a continuous transfer belt running through a lateral conveyor section 103 and a upwardly angled discharge conveyor section 105. During typical offloading operations, one or more randomly selected trailers 101 discharge sand to the lateral conveyor section 103 at a given time.

Sand being discharged by each trailer discharge conveyor 102a-102d falls through slots 104 and onto lateral conveyor section 103. Lateral conveyor section 103 then carries the sand to upwardly angled discharge conveyor section 105, which discharges the sand to a bin of a blender truck 119 (FIGS. 3 and 5C), which mixes the sand with water and chemicals in quantities needed for the formulation of the particular fracing fluid being used.

The amount of sand being transferred at any one time in system 100 can be substantial. For example, a Convey-All Unibelt conveyor can nominally transfer and discharge 22,000 pounds per minute of sand from trailers 101a-101d. The generation of a corresponding substantial amount of fine silica dust is a natural consequence of this transfer and discharge process.

According to the principles of the present invention, silica dust generated during the offloading of trailers 101a-101d is collected by suction at selected points around system 100 most susceptible to the generation and discharge of silica dust. In the preferred embodiment, silica dust is collected: (1) within the compartments of the tanks of trailers 101a-101d; (2) at the base of each trailer discharge conveyor 102a-102d, near the point at which sand is received from the trailer lateral conveyor and the trailer tanks; (3) at the point sand is discharged from trailer discharge conveyors 102a-102d through slots 104 and onto lateral conveyor section 103; (4) at multiple points along upwardly-angled discharge conveyor section 105; and (5) near the point sand is discharged from the spout of discharge conveyor 105 in to the bin of blender 119. It should be noted that in alternative embodiments, silica dust may be collected at additional points, or even fewer points, within system 100, as required.

The silica dust control function of system 100 is driven by a silica dust control unit 106, which draws silica dust-bearing air collected at points across the system though a pair of large manifolds 107 and 108. In the illustrated embodiment of system 100, silica dust control unit 106 also draws silica dust-bearing air directly from trailer 101d through flexible hosing 109, although this is not a strict requirement of the principles of the present invention. Silica dust control unit 106, which may include a baghouse and/or cyclone, separates the silica dust from the air and discharges substantially silica dust-free air into the surrounding environment. One exemplary silica dust control unit, suitable for use as silica dust control unit 106 of system 100, is an ETI Cyclone 20 DC system, available from Entech Industries, which includes multiple twenty-inch (20") inlets and produces a nominal airflow of 20000 cubic feet per minute (cfm).

Silica dust control unit 106 establishes airflow in the direction shown by arrows in FIG. 2. In the preferred embodiment, two intake ports of silica dust control unit 106 are pneumatically connected with manifolds 107 and 108, which run along corresponding sides of lateral conveyor section 103, and one intake port of silica dust control unit 106 is directly pneumatically connected to trailer 101d through flexible hosing 109.

Silica dust generated in each of the compartments of trailers 101a-101d is collected through a corresponding set of fittings 110a-110f and hoses 111a-111e. In the illustrated embodiment of system 100, the compartments of trailers 101a-101c are pneumatically coupled to manifold 107 through flexible hosing 113a-113c. For trailer 101d, one fitting 110 is replaced with a four-way fitting 112, which directly pneumatically couples the compartments of trailer 101d with silica dust control unit 106.

Flexible hoses 114a-114c, which tap manifold 107, and the flexible hose 114d, which taps manifold 108, collect silica dust at the bases of each trailer discharge conveyor 102a-102d. Flexible hoses 115a-115d, which tap manifold 108, collect silica dust at the discharge points of trailer discharge conveyor 102a-102d into slots 104a-104c of lateral conveyor section 103. Flexible hoses 116a-116d, which tap manifold 108, collect silica dust moving up upwardly angled discharge conveyor section 105. It should be noted that the pneumatic paths between silica dust collection hoses 113, 114, 115, and 116 and silica dust control unit 106 may vary between embodiments of system 100. In the preferred embodiment of system 100 shown in FIG. 1, the tapping point, as well as the manifold 107 or 108 being tapped, minimizes the lengths of manifolds 107 and 108 and silica dust collection hoses 113, 114, 115, and 116. Generally, so long as sufficient suction is available at a given silica dust collection point, the manifold 107 or 108 tapped, the point on the manifold 107 or 108 tapped the corresponding flexible hose, or both, may be varied.

A flexible hose 117, which taps manifold 107, captures silica dust generated by the discharge of sand from upwardly angled discharge conveyor 105 into the bin of blender 119. (While flexible hose 117 taps manifold 107, in alternative embodiments flexible hose 117 may tap manifold 108).

Manifolds 107 and 108 include a number of straight sections 120 and bent or curved sections 121 and are preferably constructed as tubes or pipes of rigid metal, such as aluminum. Rigid metal embodiments provide durability, particularly when manifolds 107 and 108 sit on or close to the ground and/or are exposed to contact by personnel or to other structures within system 100. However, in alternative embodiments, manifolds 107 and 108 may be constructed, either in whole or in part, from sections of semi-rigid conduit or flexible (corrugated) hose. For example, semi-rigid conduit or flexible hose may be used in sections 121 of manifolds 107 and 108 that must be bent to provide a path around, over, or under, other structures in system 100.

Preferably, manifolds 107 and 108 are each constructed in multiple straight sections 120 and multiple bent or curved sections 121, which are clamped together using conventional clamps. This preferred construction allows manifolds 107 and 108 to be efficiently assembled and disassembled at the worksite, allows the most direct paths to be taken to silica dust control unit 106, and allows the overall system of conduits to be adapted to different configurations of system 100 (e.g., different types and number of trailers 101, different transportable conveyor systems, different surface conditions).

Additionally, the diameters of the various sections of manifolds 107 and 108 may increase or decrease, depending on the airflow provided by the given silica dust control unit 106. The diameters of manifolds 107 and 108 are determined by a number of factors, including the intake diameters of silica dust control unit 106, the airflow produced by silica dust control unit 106, and the amount of suction needed at the silica dust collection points. Similarly, the diameters of silica dust collection hoses 113, 114, 115, and 116 will depend on factors such as the airflow available from silica dust control unit 106, the diameters of manifolds 107 and 108, and the amount of suction required at a given hose inlet. In one typical embodiment of system 100, manifolds 107 and 108 have a nominal diameter of twenty inches (20") and silica dust collection hoses 113, 114, 115, and 116 are nominally within the range of six to sixteen inches (6"-16") in diameter. In other words, the principals of the present invention advantageously allow for variations in the components and configuration of system 100.

It should be recognized that the transportable conveyor system, including lateral conveyor section 103 and discharge conveyor section 105, is not always required. In this case, one or more trailer discharge conveyors 102 discharge sand directly from the corresponding trailers 101 into the bin of blender 119. In embodiments of system 100 that do not utilize the transportable conveyor system, only a corresponding number of flexible hoses 114 and 115 are required for collecting silica dust at the base and outlet of each trailer discharge conveyor 102 discharging to blender 119. (Along with the desired connections for removing dust within the trailers 101 themselves.) Advantageously, only single manifold 107 or 108 may be required in these embodiments.

FIG. 4A is a more detailed diagram showing the pneumatic connections between manifolds 107 and 108 and silica dust control unit 106. FIG. 4B shows the direct pneumatic connection between trailer 101d and silica dust control unit 106 through flexible hose 109 in further detail.

Figure 4C:
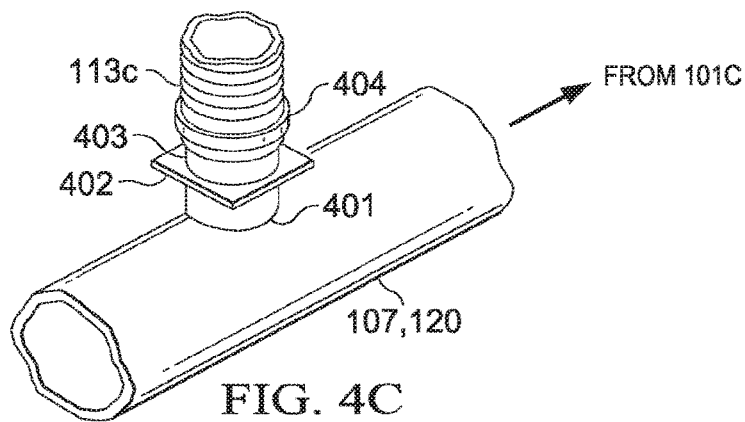
FIG. 4C is a diagram showing in further detail the pneumatic connection between a selected manifold and the silica dust control conduit subsystem serving another selected trailer of FIG. 1.
Figure 4D:
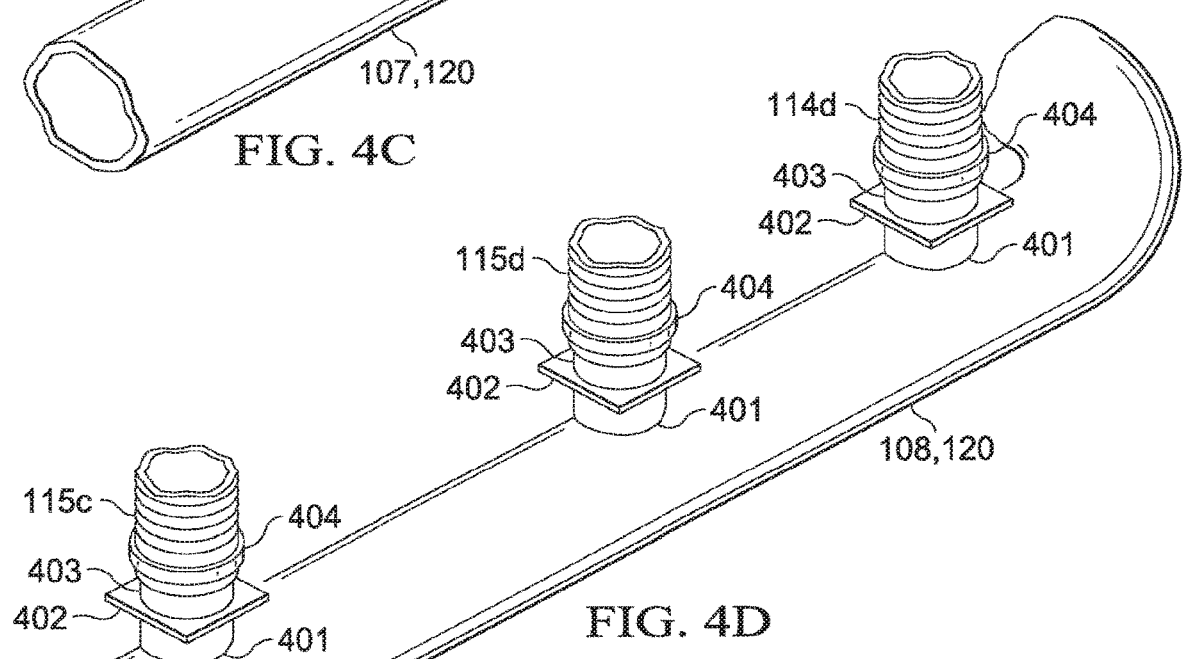
FIG. 4D is a diagram showing in further detail the pneumatic connections between a selected manifold and the silica dust capture hose controlling silica dust generated during the operation of a corresponding trailer discharge conveyor shown in FIG. 1.
Figure 4E:
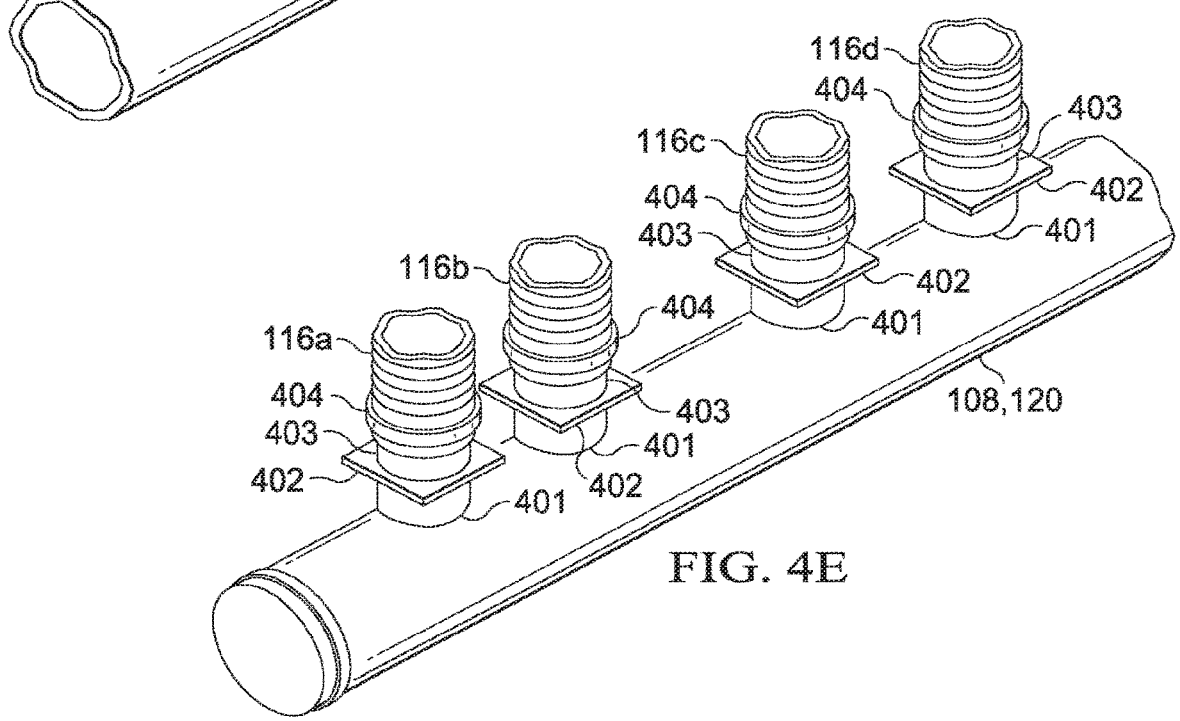
FIG. 4E is a diagram showing in further detail the pneumatic connections between a selected manifold and the silica dust capture hoses controlling silica dust generated by the system discharge conveyor of FIG. 1.

FIGS. 4C-4E illustrate representative tapping points between the heavier rigid sections 120 of manifolds 107 and 108 and selected flexible hoses utilized in system 100. In particular, FIG. 4C shows a representative pneumatic connection between manifold 107 and hose 113c collecting silica dust from the tank compartments of trailer 101c. FIG. 4D shows representative pneumatic connections between manifold 108 and hose 114d, which collects silica dust generated at the base of trailer discharge conveyor 102d, and hoses 115c and 115d, which collect silica dust generated at corresponding outlets of trailer discharge conveyors 102c and 102d. FIG. 4E shows representative pneumatic connections between manifold 108 and hoses 116a-116d collecting silica dust generated by discharge conveyor section 105.

As well known in the art, numerous techniques are commonly utilized for connecting flexible hose with a rigid conduit or pipe, many of which are suitable for use in system 100. In the illustrated embodiment shown in FIGS. 4C-4D, an aperture is tapped through the wall of the given manifold 107 or 108 and the lower periphery of a fitting (e.g., aluminum or steel pipe) 401 is attached, for example, by welding or brazing. The lower section of a coupling 402 is attached to the upper periphery of fitting 401, for example by welding or brazing. The tubular upper section 403 of coupling 402 is received with the periphery of the corresponding hose, which is then clamped in place by one or more conventional clamps 404. When necessary, an extension or elbow (not shown) may be provided between upper section 403 of coupling 402 and the corresponding hose. Similarly, a reduction coupling (see FIG. 5A, designator 501) may be provided between upper section 403 and coupling 402, as required to transition to the selected hose diameter.

In the preferred embodiment shown in FIGS. 4C-4E, each coupling 402 includes a slide gate, which provides for air flow control between the given silica dust capture hose 113, 114, 115, and 116 and the corresponding manifold 107 or 108. In addition to allowing control of the amount of suction produced at the capture hose inlet, these slide gates also allow any unused taps to manifolds 107 and 108 to be completely shut off, particularly when a hose is not connected to coupling 402.

Figure 5A:
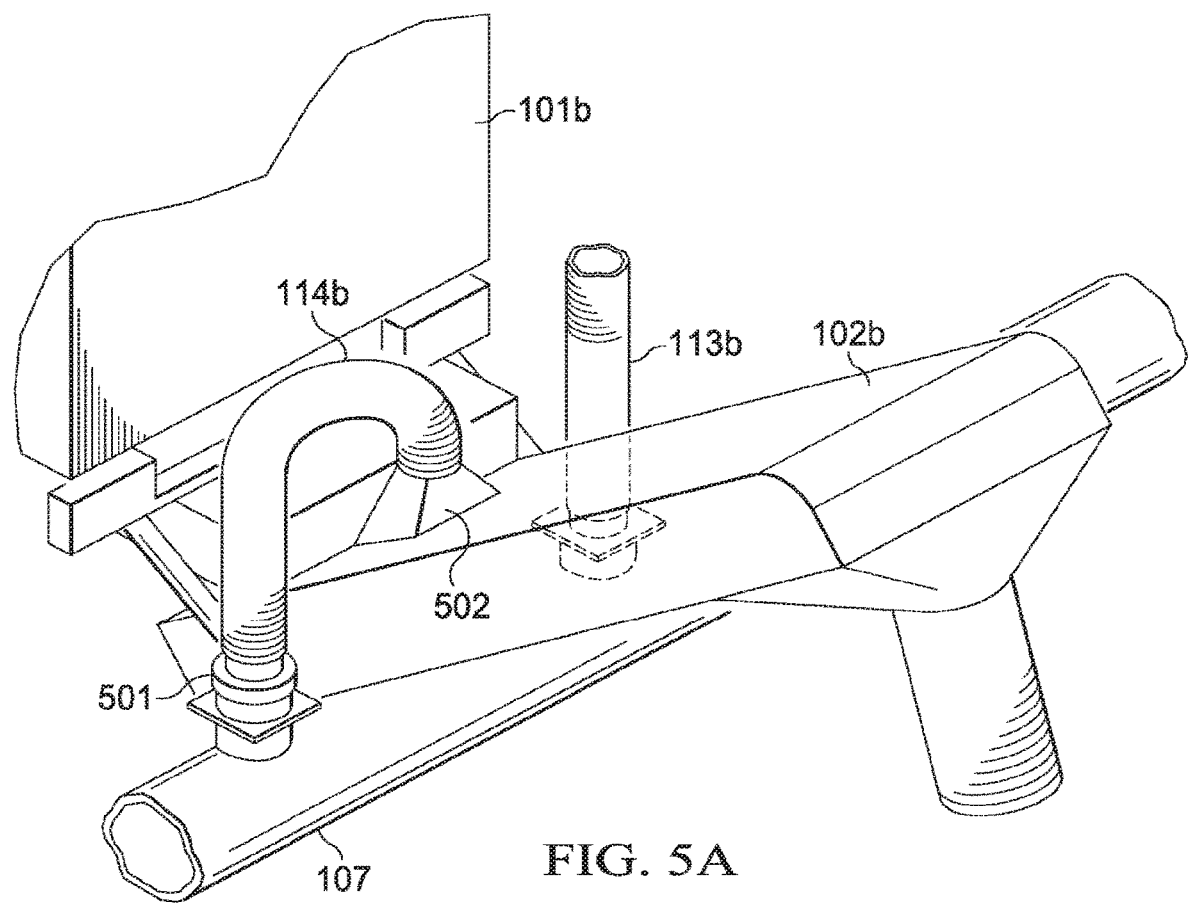
FIG. 5A is a diagram showing in further detail a selected silica dust capture hose controlling silica dust generated by the discharge of frac sand from the tank of representative trailer to the base of the corresponding trailer discharge conveyor shown in FIG. 1.

FIG. 5A depicts in further detail representative silica dust collection hose 114$b$ collecting silica dust generated at the base of trailer discharge conveyor 102$b$. Hose 114$b$ pneumatically couples with manifold 107 through a reduction coupling 501. The inlet end of hose 114$b$, which includes an optional nozzle or shroud 502, is disposed proximate the point where the lateral conveyor of trailer 101$b$ discharges sand to the base of trailer discharge conveyor 102$b$. Silica dust generated during sand transfer is captured by the suction created by silica dust control unit 106 at the discharge end of hose 114$b$ and carried through manifold 107 to silica dust control unit 106 to be filtered from the air. Silica dust collection hoses 114$a$, 114$b$, 114$c$, and 114$d$, which respectively collect silica dust generated at the bases of trailer discharge conveyors 102$a$, 102$b$, 102$c$ and 102$d$, are similar in configuration and operation.

Figure 5B:
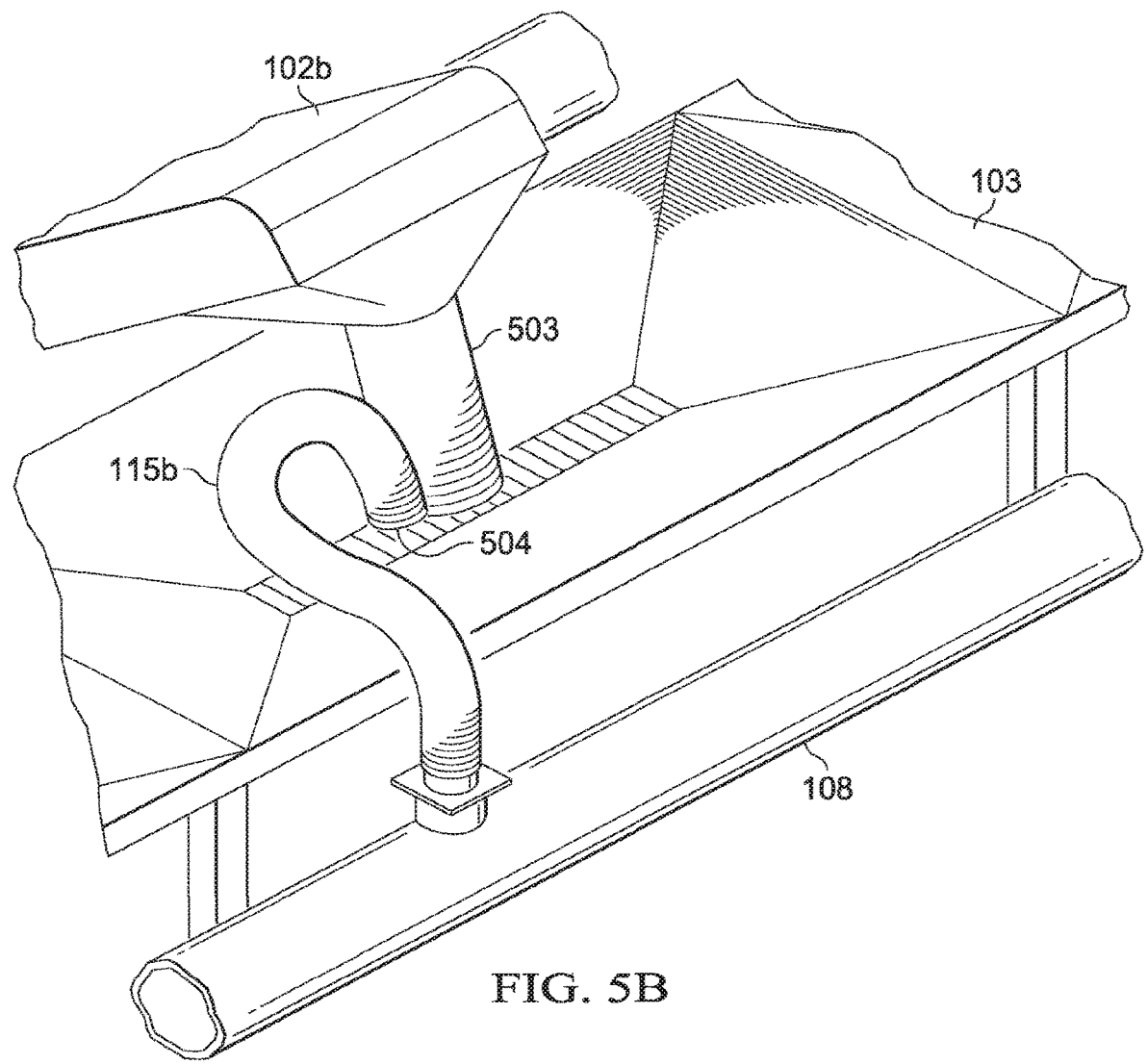
FIG. 5B is a diagram showing in further detail a selected silica dust capture hose controlling silica dust generated by the discharge of frac sand from the outlet of a corresponding representative trailer conveyor to the lateral transfer conveyor section of FIG. 1.

FIG. 5B depicts in further detail representative silica dust collection hose 115$b$ collecting silica dust generated during the discharge of sand from trailer discharge conveyor 102$b$ into lateral conveyor section 103. In the illustrated embodiment, trailer discharge conveyor 102$b$ discharges through a section of flexible hose (conduit) 503 into the corresponding slot 104 of lateral conveyor section 103. The inlet 504 of silica dust collection hose 115$b$ is disposed proximate the outlet of flexible hose 503. The suction produced by silica dust control unit 106 gathers silica dust generated during the transfer of sand, which in turns moves to silica dust control unit 106 for filtering through manifold 108. The configuration and operation of silica dust collection hoses 115$a$, 115$b$, 115$c$, and 115$d$, which respectively collect silica dust from the discharge points of trailer conveyors 102$a$, 102$b$, 102$c$, and 102$d$ into lateral conveyor section 103 are similar.

Figure 5C:
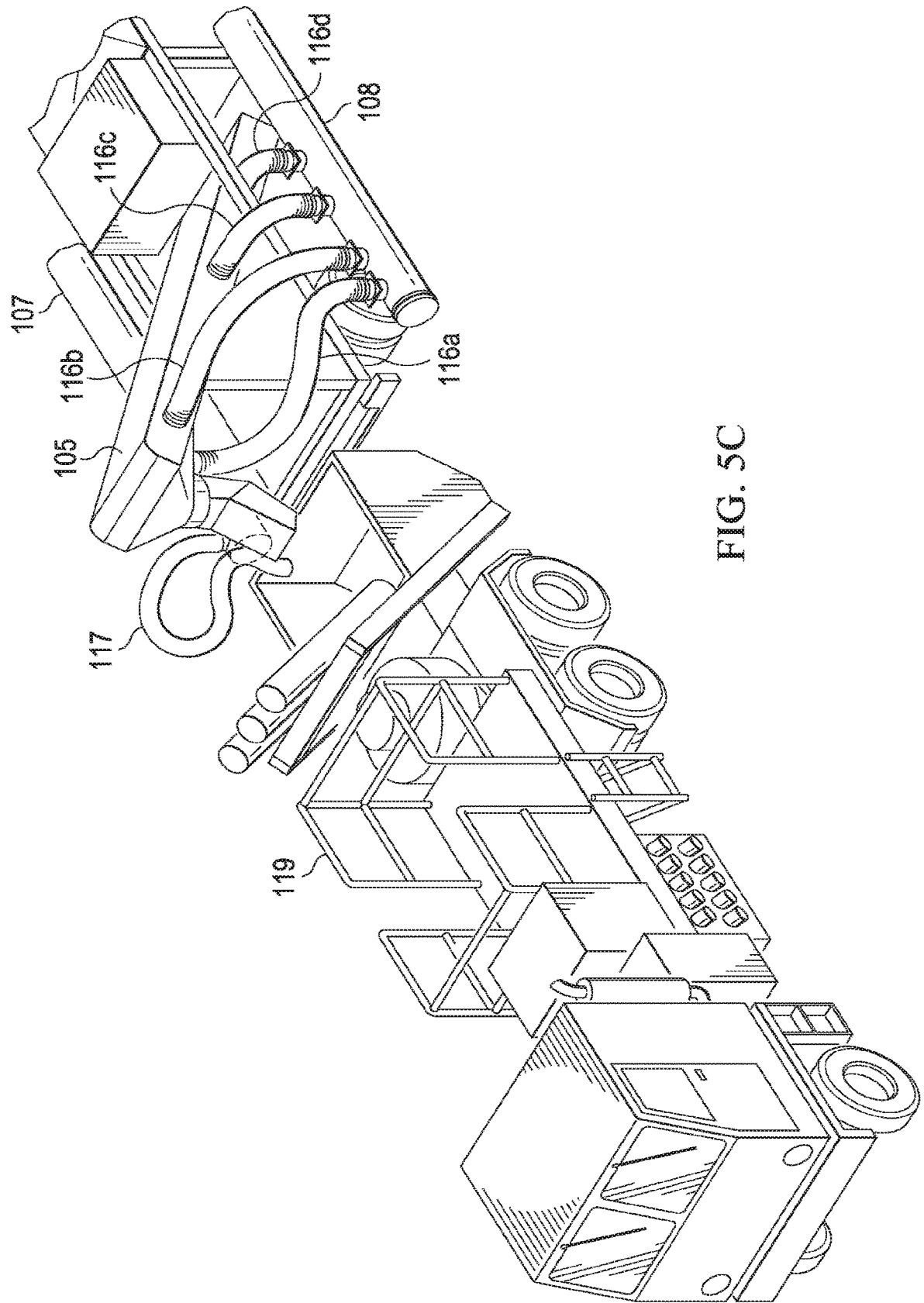
FIG. 5C is a diagram showing the hoses controlling silica dust generated during the movement of sand by the upwardly angled conveyor section of FIG. 1 to a point above the bin of the blender of FIG. 1, along with the silica dust capture hose controlling silica dust generated during the discharge of sand into the blender bin from the conveyor section spout.

Silica dust collection hoses 116$a$-116$d$, and the suction generated by silica dust control unit 106, collect silica dust generated by the lifting and discharge of sand by discharge conveyor section 105. As shown in FIG. 5C, silica dust collection hoses 116$a$-116$d$ extend from apertures through the body of discharge conveyor section 105 at selected spaced-apart points. During operation, silica dust generated as sand moves upwards towards the outlet spout is removed through silica dust collection hoses 116$a$-116$d$ and manifold 108 for filtering by silica dust control unit 106.

FIG. 5C also one possible configuration for flexible 117 with respect to the spout of upwardly angled conveyor 105. Generally, the intake end of flexible hose 117 is located near the discharge point of the spout of conveyor 105 and creates an updraft, which captures silica dust generated as sand falls into the bin of blender 119. The actual attachment point of flexible hose 117 to the spout of conveyor 105, as well as the proximity of the intake end of hose 117 to the blender bin, may vary in actual practice of system 100.

Figure 6A:
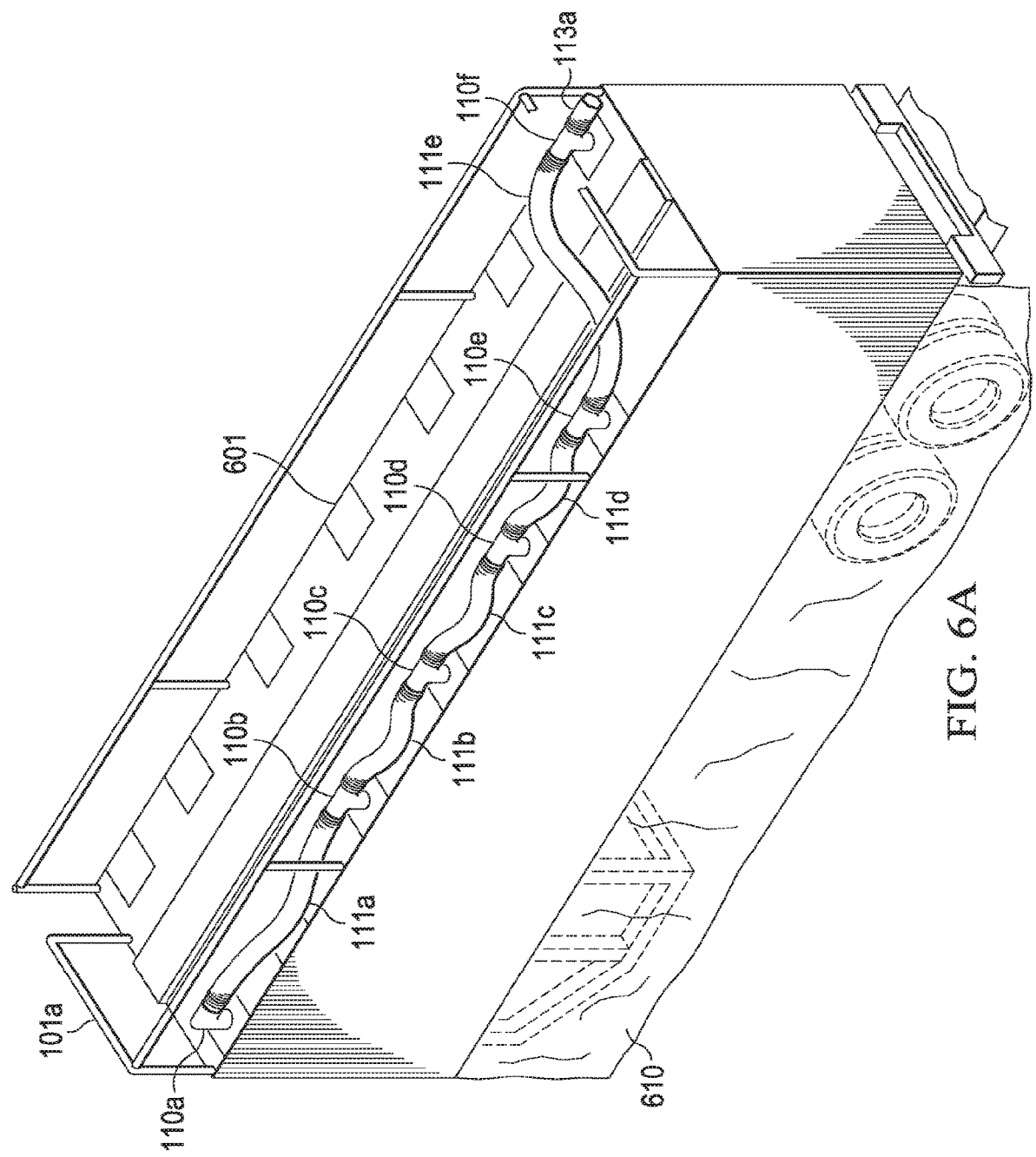
FIG. 6A is a diagram showing in further detail the pneumatic connections of the silica dust control conduit subsystem of a representative one of the trailers of FIG. 1.
Figure 6B:
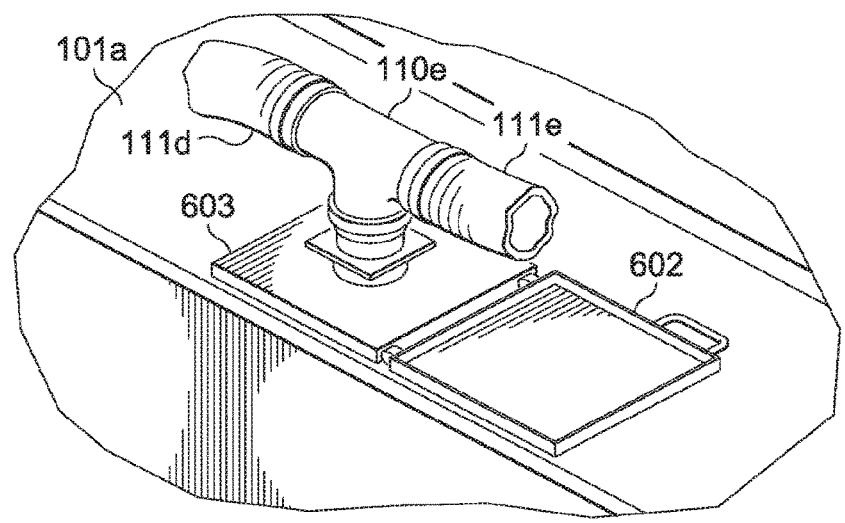
FIG. 6B is a diagram showing in further detail one of the T-fittings interconnecting the air conduits of the silica dust control conduit subsystem shown in FIG. 6A.
Figure 6C:
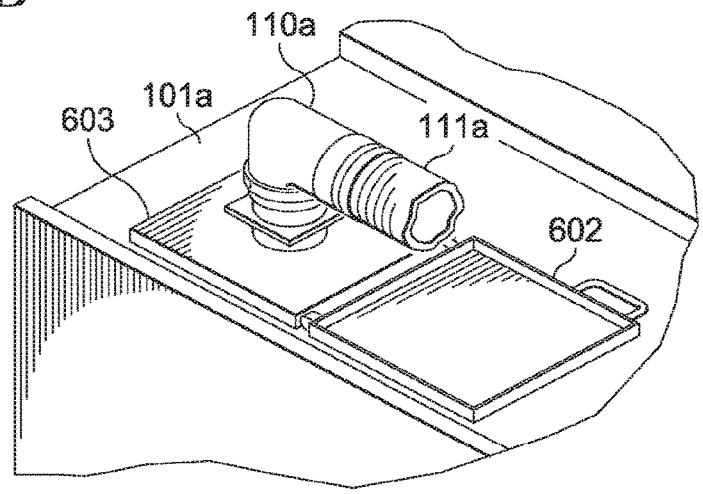
FIG. 6C is a diagram showing one of the end fittings terminating the air conduits of the silica dust control conduit subsystem shown in FIG. 6A.

As discussed above, silica dust generated in the compartments of the tanks of trailers 101$a$-101$d$ is collected by a set of fittings 110 and hoses 111. FIGS. 6A-6C depict this subsystem in further detail, using trailer 101$a$ as an example.

Each trailer 101 includes a set of inspection hatches 601 through the trailer roof. In the illustrated embodiment, trailers 101 include two rows of hatches 601 that run along opposing sides of the trailer roof. (In other embodiments of trailers 101, the number and location of inspection hatches 601 may differ. For example, some commercially available sand storage trailers utilize a single row of inspection hatches that run along the centerline of the trailer roof.)

In addition, FIG. 6A shows optional skirts 610, which run along each side of the depicted trailer 101. Skirts 610, which are preferably constructed from a durable flexible material, such as heavy plastic or canvas, contain silica dust generated by the movement of sand through the lateral conveyor that runs underneath the trailer tank.

Figure 6D:
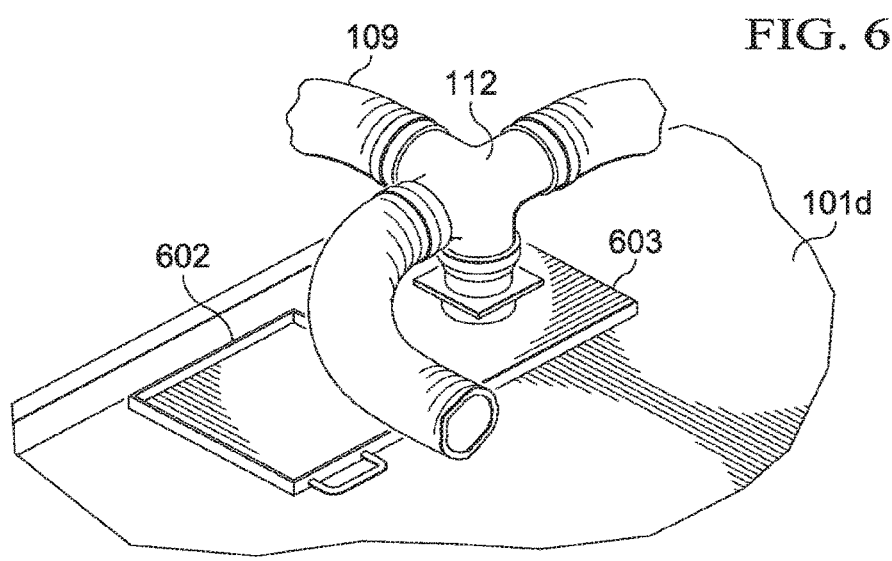
FIG. 6D is a diagram showing the four-way fitting interconnecting the air conduits of the silica dust control subsystem of one particular trailer with the silica dust control unit, as shown in FIG. 4B.

In the preferred embodiment of system 100, silica dust collection is performed using the hatches 601 running along one side of the trailer tank, although in alternative embodiments silica dust collection could be performed using the hatches running down both sides of the trailer tank. For a given compartment, the regular hatch 602 is pulled back and replaced with corresponding cover 603 attached an associated fitting 110 (FIGS. 6B-6D).

FIG. 6B shows in further detail an example of a T-shaped (three-way) fitting 110$e$ interfacing with corresponding hoses 111$d$ and 111$e$. FIG. 6C shows an example of a elbow (two-way) fitting 110$a$ and the final section of hose 111$a$ in the trailer silica dust subsystem. The remaining connections between the given trailer 101 and fittings 110 and 111 are similar. The four-way fitting 112 used to connect trailer 101$d$ and silica dust control unit 106 through hose 109 is shown in detail in FIG. 6D. In each case, fittings 110 include well-known transitions and clamps to connect to hoses 111. Similar to the taps shown in FIGS. 4C-4E, each fitting, such as T-shaped (three-way) fitting 110$e$, elbow fitting 110$a$, and four-way fitting 112, includes a slide gate for controlling airflow between the space within the given trailer 101 and manifold 107.

Figure 7A:
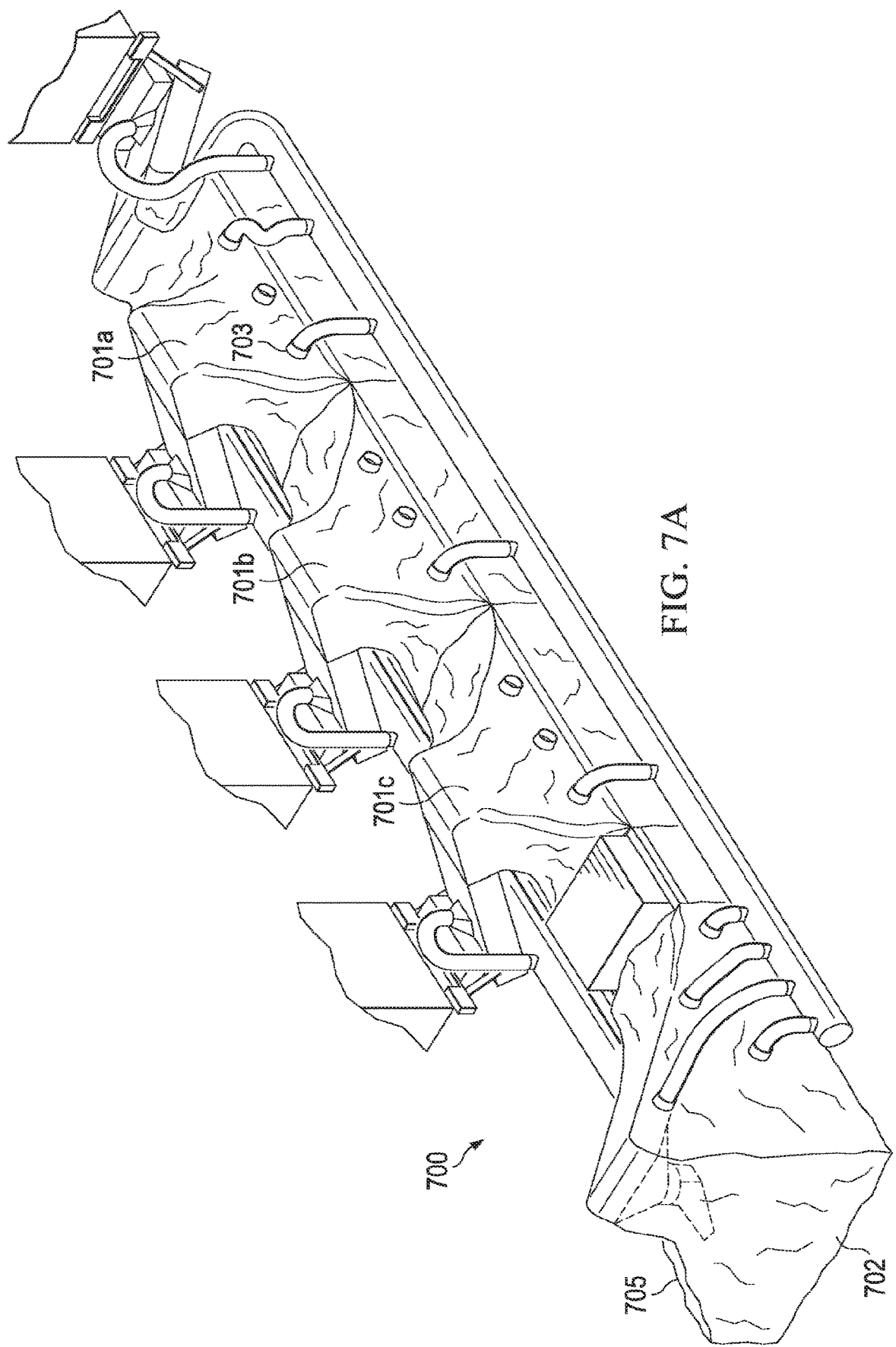
FIG. 7A is a diagram showing an alternative embodiment of the principles of the present invention in which a cover is provided over portions of the representative frac sand transportation and unloading system of FIG. 1 for containing silica dust generated during movement of sand through the system.
Figure 7B:
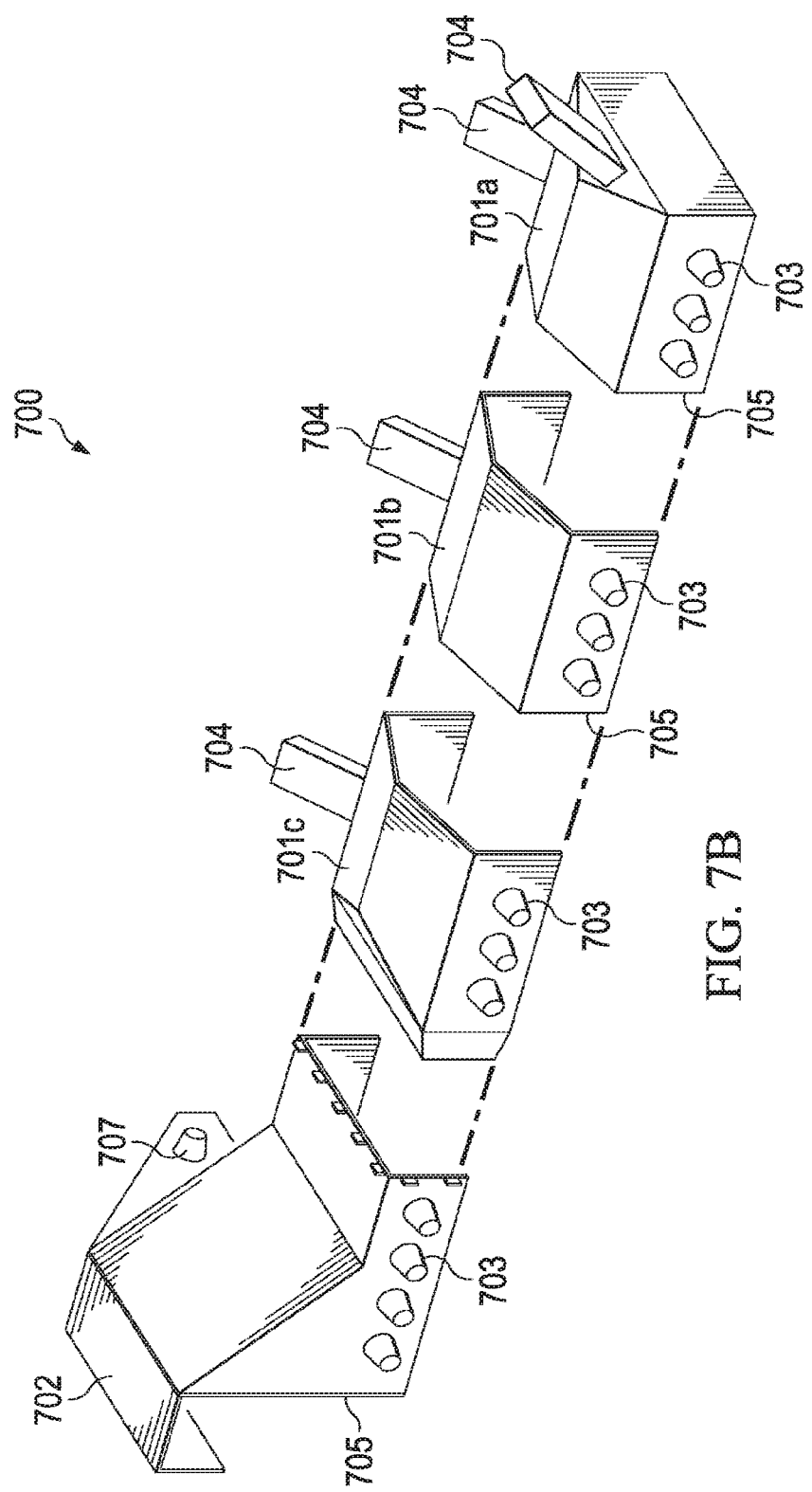
FIG. 7B is a conceptual diagram providing a first detailed view of a representative embodiment of the cover shown in FIG. 7A.
Figure 7C:
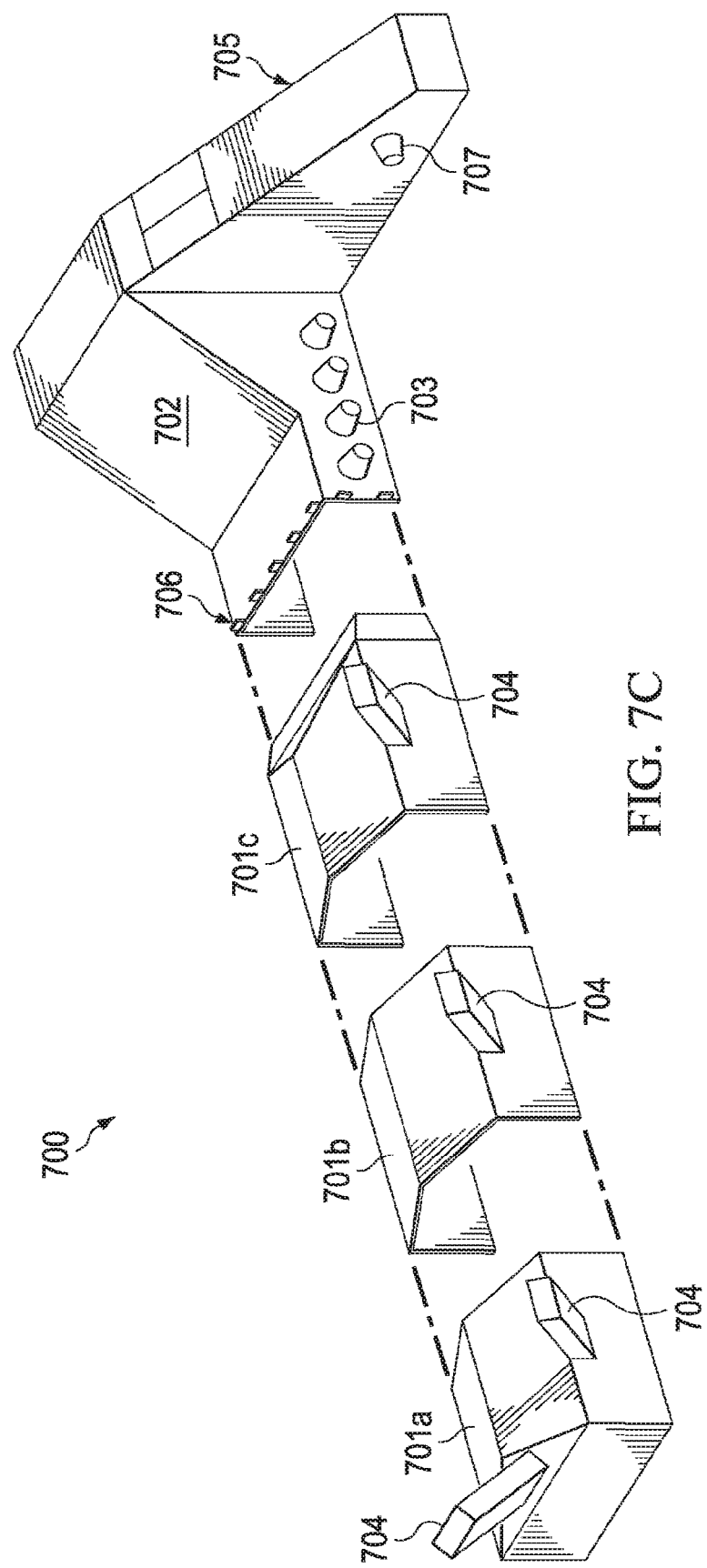
FIG. 7C is a conceptual diagram providing a second detailed view of the representative embodiment of the cover shown in FIG. 7A.

FIGS. 7A-7C illustrate an enhancement to system 100, which includes a flexible cover system 700 for containing the silica dust generated during the movement of sand through the system. Preferably, flexible cover system 700 extends over the discharge ends of trailer discharge conveyors 102$a$-102$d$, the length of lateral conveyor section 103, and the length of upwardly angled discharge conveyor section 105. (In alternative embodiments, flexible cover system 700 may only cover portions of system 100, as necessary to effectively control silica dust.)

In the preferred embodiment, flexible cover system 700 is constructed as separate sections 701$a$-701$c$ and 702, as shown in FIGS. 7B and 7C. Sections 701$a$-701$c$ cover corresponding portions of lateral conveyor section 103 and section 702 covers upwardly angled discharge conveyor section 105. Boots 703 are provided to allow insertion of corresponding flexible capture hoses 115 and 116 into the underlying silica dust containment spaces when cover system 700 is deployed. Boots 704 extend over the ends of trailer discharge conveyors 102$a$-102$d$.

Section 702 also includes a lateral extension 705 for covering the spout of upwardly angled discharge conveyor section 105. A boot 707 provides for the insertion of flexible hose 117 into extension 702 for fastening on or near the outlet of the discharge spout of conveyor 105.

Flexible cover system 700 is preferably constructed of canvas, heavy plastic, or other flexible material that is durable, relatively easy to deploy and remove, and transportable. Preferably, the surfaces of the selected material are impervious to frac sand, as well as able to withstand the normal wear and tear expected at a fracing worksite. When deployed, sections 701 and 702 are attached to each other with areas of Velcro 706 or similar attachment system, which minimizes the escape of silica dust at the seams between the sections.

Figure 8A:
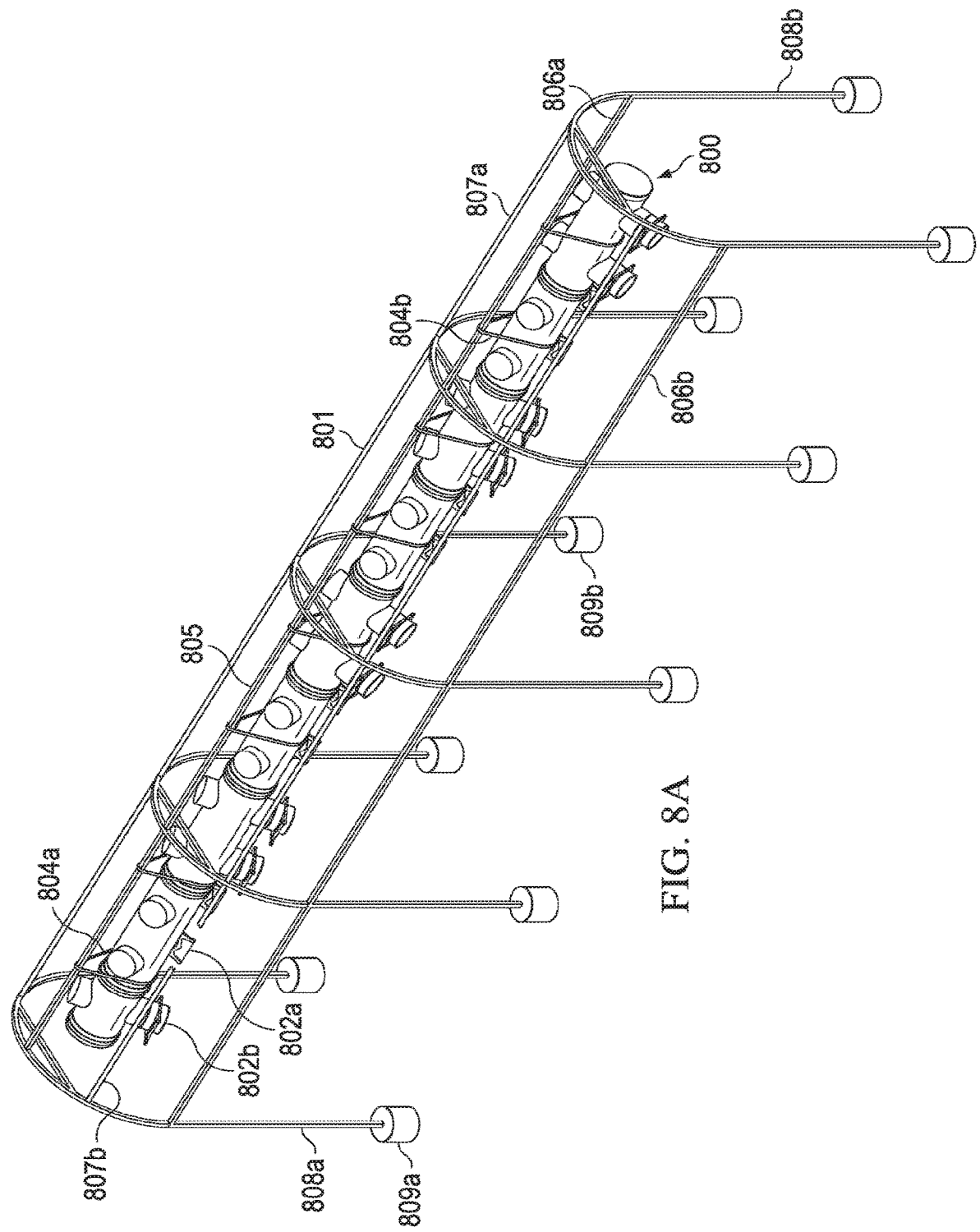
FIG. 8A is a perspective view diagram of a representative raised manifold system according to the principles of the present invention, which is suitable for use in a frac sand silica dust control system, such as that shown in FIG. 1.
Figure 8B:
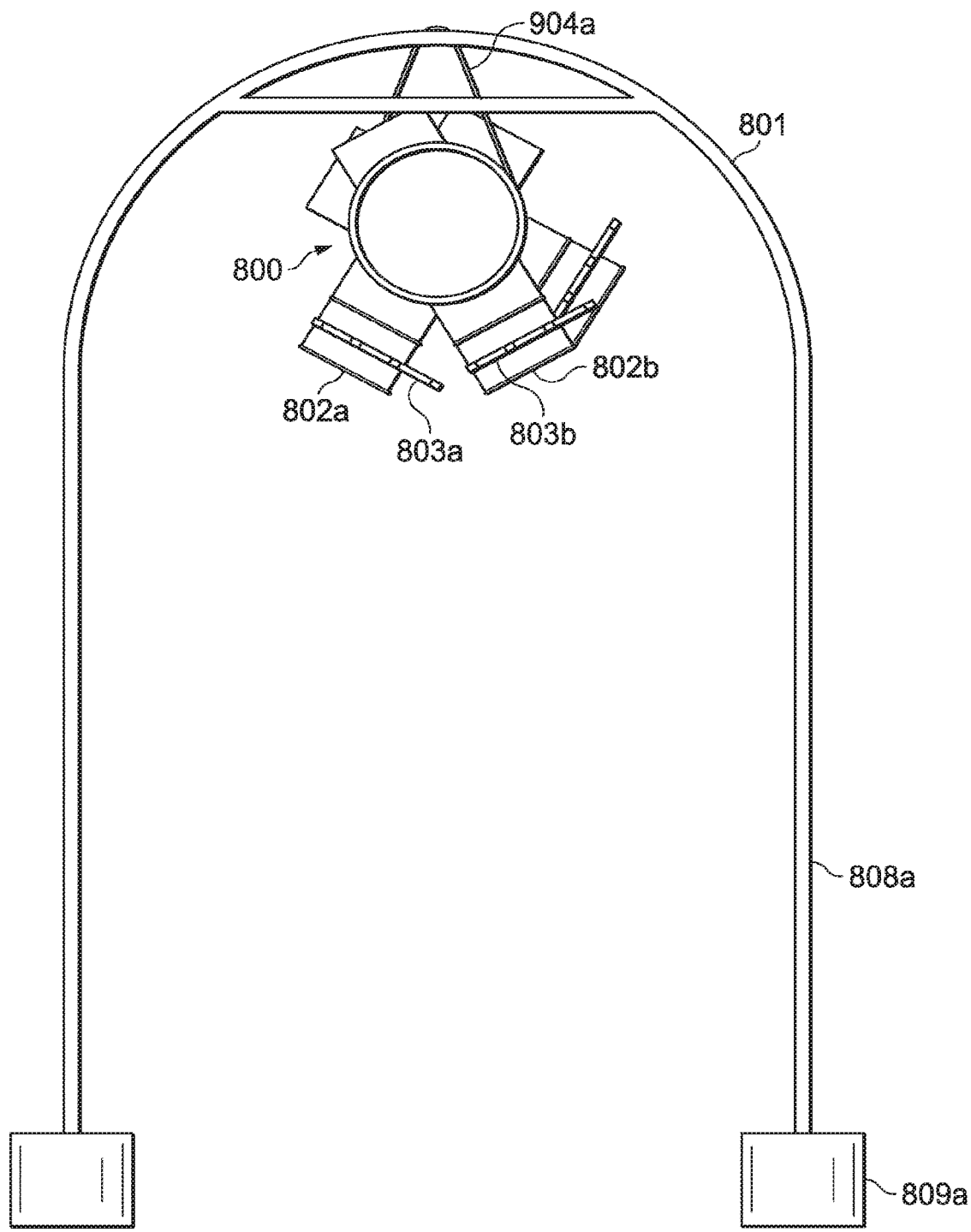
FIG. 8B is an end elevational view diagram of the raised manifold system of FIG. 8A.

FIGS. 8A and 8B are respectively perspective and end view diagrams of a raised manifold system 800 suitable for use in frac sand dust control systems, such as that described above in conjunction with FIG. 1. Depending on the configuration of the dust control system, raised manifold 800 may be used to replace either or both of manifolds 107 and 108 of FIG. 1 or be used in addition to manifolds 107 and 108.

As discussed further below, when in use in a dust collection system such as system 100 of FIG. 1, raised manifold 800 is located generally above lateral conveyor section 103, angled lifting conveyor section 105, the bin and/or the tub of blender 119, or a combination thereof. In the embodiment of FIG. 8A, raised manifold 800 is suspended from a support structure 801, which may also be used to support a cover or enclosure for enclosing lateral conveyor section 103, lifting conveyor section 105, and/or the bin and tub of blender 119.

As shown in FIGS. 8A and 8B, fluid communication with the interior passage of raised manifold 800 is through a set of rigid cylindrical fittings 802 coupled to taps or apertures through the manifold wall. In other words, fittings 802 provide a plurality of ports into raised manifold 800 for capturing dust when negative air pressure (i.e., suction) is applied to manifold 800, for example, by air unit 106 in embodiments of system 100. In some instances, fittings 802 are not required. For example, within a dust control enclosure, such as those discussed further below, a port into the interior of manifold 800 can be a simple aperture through the manifold wall, which can be capped when not in use.

Two representative fittings are shown at 802a and 802b in FIG. 8B for reference. The actual number of fittings 802 may vary between embodiments, depending on such factors as the length of raised manifold 800, the number of fittings 802 needed to support a range of different dust control system configurations and dust control operations, and the diameters of the flexible conduits discussed below, among other things. In the illustrated embodiment, each fitting 802 includes a sliding gate 803, two of which (802a and 803b) are shown in FIG. 8B for reference. The amount of air flowing through a given fitting 802 is set by the corresponding sliding gate 803, which includes completely shutting-off air flow through an unused or unnecessary fitting 802 (with or without a rigid extension or attached flexible conduit.)

Preferably, raised manifold 800 and fittings 802 are constructed from aluminum for lightness and durability, with fittings 802 coupled to raised manifold 800 by welding or brazing. However, in alternative embodiments, raised manifold 800, fittings 802, or both, may be fabricated from other materials, such as steel or plastic, and fastened together using other fastening techniques. For example, threads may be provided on fittings 802 for mating with corresponding threads in the taps through the manifold wall.

Moreover, while raised manifold 800 is shown as a rigid conduit having a cylindrical shape, the principles of the present invention may be embodied in raised manifolds of other shapes or having different degrees of rigidity. For example, raised manifold 800 could be a flexible conduit or have a rectangular cross-section. Generally, raised manifold 800 can be any conduit or chamber having a size, shape, and rigidity suitable to provide sufficient air flow through a sufficient number of branches (i.e., fittings or ports 802) as required to achieve the desired amount of dust capture in a given dust control system having a given configuration and a given air system rated cubic feet per minute (cfm). (In the illustrated embodiment, rigid, cylindrical raised manifold 800 is nominally 20 inches in diameter and fittings 802 are nominally 10 inches in diameter, based on 40000 cfm of air flow, which could be provided by a single air system 106 or two air systems 106 providing 20000 cubic feet cfm of air flow each.)

In the illustrated embodiment of FIGS. 8A and 8B, raised manifold 800 is suspended from frame 801 by a series of periodically spaced straps 804, two of which are shown for reference at 804a and 804b. In alternative embodiment, other techniques may be used to suspend raised manifold 800, such as cables, cradles, direct bolting to support frame 801, tubing or bars, among others. The particular suspension system configuration may vary depending on such factors as the weight of raised manifold 800 and fittings 802, the number and size of fittings 802, the length and diameter of raised manifold 800, and the ability to quickly couple and uncouple raised manifold 800 and support frame 801.

Support frame 801 can be based on any one of a number of different configurations and constructions. In the embodiment illustrated in FIGS. 8A and 8B, support frame 801 includes a central upper longitudinal reinforcing member 805, lower lateral longitudinal reinforcing members 806a-806b, upper lateral longitudinal reinforcing members 807a-807b, and U-shaped support members 808, two of which are shown at 808a and 808b for reference. Generally, each U-shaped support member 808 includes a pair of opposing substantially straight vertical support members (legs) and a curved upper section. While support frame 801 is shown as having a generally inverted U-shape horizontal cross-section, other shapes are possible, such as rectangular, triangular, or ovoid, for example. When used in a dust control system such as system 100 of FIG. 1, the width between the vertical support member of U-shaped support members 808 is adapted to straddle the sides of lateral conveyor section 103, the sides of lifting conveyor section 105, the bin and/or tub of blender 119, the chutes from a vertical sand mover, or a combination thereof.

Longitudinal reinforcing members 805, 806, and 807 and U-shaped support members 808 are preferably fabricated and fastened together to maximize durability and stability while still allowing support frame 801 to be assembled and disassembled quickly at the job site. For example, longitudinal reinforcing members 805, 806, and 807 and U-shaped support members 808 may be fabricated as aluminum or steel tubing and fastened together using pins or bolts. Alternatively, longitudinal reinforcing members 805, 806, and 807 and U-shaped support members 808 could be solid aluminum or steel bars or U-shaped beams. Support frame 801 could also be constructed as sections in which some components are permanently fastened together, for example by welding or brazing.

While raised manifold 800 is shown in FIGS. 8A and 8B as being positioned along the longitudinal centerline of the upper portion of support frame 801, generally referencing central upper longitudinal reinforcing member 805, the lateral and vertical position of raised manifold 800 may vary in alternative embodiments. More specifically, raised manifold 800 may be laterally and/or vertically displaced with respect to central upper longitudinal reinforcing member 805. The actual location of raised manifold 800 may be varied as needed, for example, to accommodate different underlying structures, such as the discharge ends of trailer conveyors 102 and angled lifting conveyor 105, or variations in the length of the flexible conduits discussed below.

In the illustrated embodiment, U-shaped frame members 808 are directly supported by the ground through bases 809, two of which are shown at 809a and 809b for reference. In alternative embodiments, U-shaped frame members 808 may be supported or attached, either in whole or in part, by another structure within the dust control system, such as lateral conveyor section 103, blender 119, or angled lifting conveyor section 105. For example, U-shaped frame members 808 may be attached or supported by the top or fastened to a lateral surface of lateral conveyor section 103.

A given fitting 802 may be used unmodified (i.e., not connected to a flexible conduit or rigid extension), connected to a flexible conduit that extends towards the upper surface of lateral conveyor section 103, to a point along angled lifting conveyor section 105, or the bin and tub of blender 119, or may be extended lengthwise to form a longer rigid conduit for drawing in air and dust from a selected dust collection point, such as a point along lateral conveyor section 103 or within the bin of blender 119. Not all fittings 802 need be used, with those not being used closed by the associated sliding gate 803 or capped.

Figure 8C:
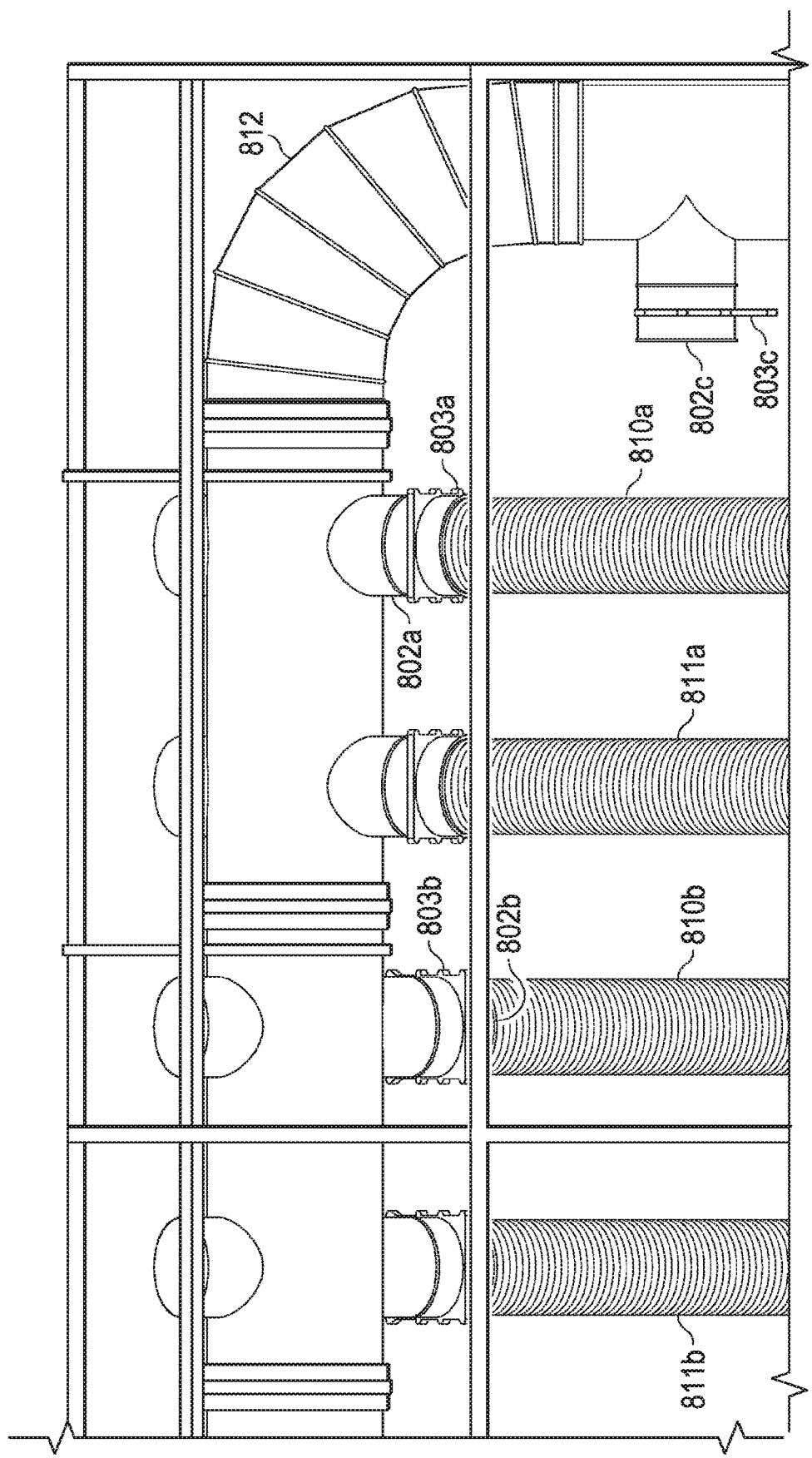
FIG. 8C is a diagram providing a more detailed side elevational view of a portion of the raised manifold system of FIG. 8A along with a representative number of attached dust collection conduits.

FIG. 8C is a more detailed view of a portion of raised manifold 800 and support frame 801. Representative fittings 802, including fittings 802a and 802b of FIGS. 8A and 8B, are shown connected to flexible conduits. Generally, local flexible conduits 810 are used to collect air and dust at selected points along lateral conveyor section 103, along angled lifting conveyor 105, or within the bin and/or tub of blender 119. Remote flexible conduits 811 are used to collect air and dust from within sand storage containers, such as trailers 101 of FIG. 1.

FIG. 8C also shows an elbow conduit 812 for coupling raised manifold 800 to a source of negative air pressure, such as air system 106 of FIG. 1. Elbow conduit 812 is constructed, either in whole or in part, by a rigid or semi-rigid material such as aluminum, or a flexible material, such as rubber or polyurethane. An additional fitting 802c and associated sliding gate 803c tap into elbow conduit 812.

Figure 8D:
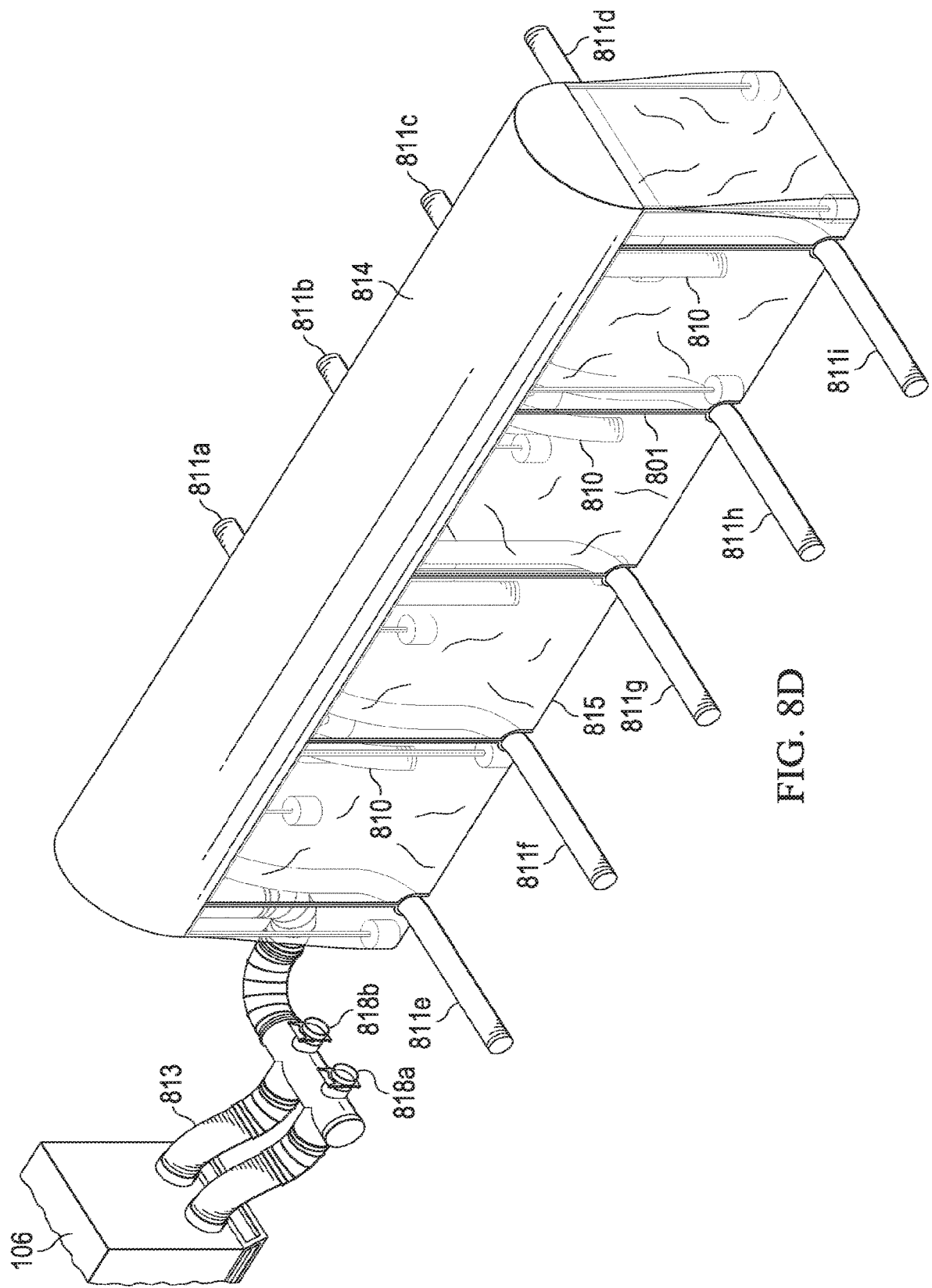
FIG. 8D is a perspective view diagram of the raised manifold system of FIG. 8A shown connected to an associated air movement system and disposed within an enclosure suitable for containing dust generated along the lateral conveyor and/or lifting conveyor of FIG. 1.

In FIG. 8D, raised manifold 800 is shown in combination with an enclosure 814, which is configured to enclose lateral conveyor section 103, angled lifting conveyor section 105, the bin and tub of blender 119, or any combination of the three. Elbow conduit 812 couples with air unit 106 through a manifold system 813, which includes sections of rigid and flexible conduit, although other configurations may be used in alternative embodiments. For example, air system 106 could be connected either to elbow conduit 812 or directly to raised manifold 800 by a flexible conduit (i.e., eliminating elbow conduit 812, conduit system 813, or both). FIG. 8D also includes optional fitting/air flow control assemblies 818a-818b, which allow for additional local or remote flexible conduits to be connected directly to conduit system 813.

The inlets of local flexible conduits 810 remain within enclosure 814, while remote flexible conduits 811 run under bottom edge 815 of enclosure 814 or through an aperture through the sidewall of enclosure 814 near bottom edge 815. In alternative embodiments, remote flexible conduits 811 could exit enclosure 814 at different points, including points higher up on the sidewalls of enclosure 814 or through the enclosure 814 roof.

Enclosure 814 is not required for using raised manifold 800, although use of enclosure 814 increases the efficiency of dust capture through manifold 800 and flexible conduits 810, as well as generally minimizes the escape of dust into the surrounding environment. Moreover, when enclosure 814 is used, one or more unmodified fittings 802 can be used for capturing dust within the confined space. Furthermore, while enclosure 814 is shown as having substantially clear sidewalls and an opaque roof, these are not requirements for practicing the inventive principles. For example, the sidewalls may be opaque and the roof may be substantially clear, both the roof and the sidewalls may be opaque, or both the roof and the sidewalls may be substantially clear.

Figure 8E:
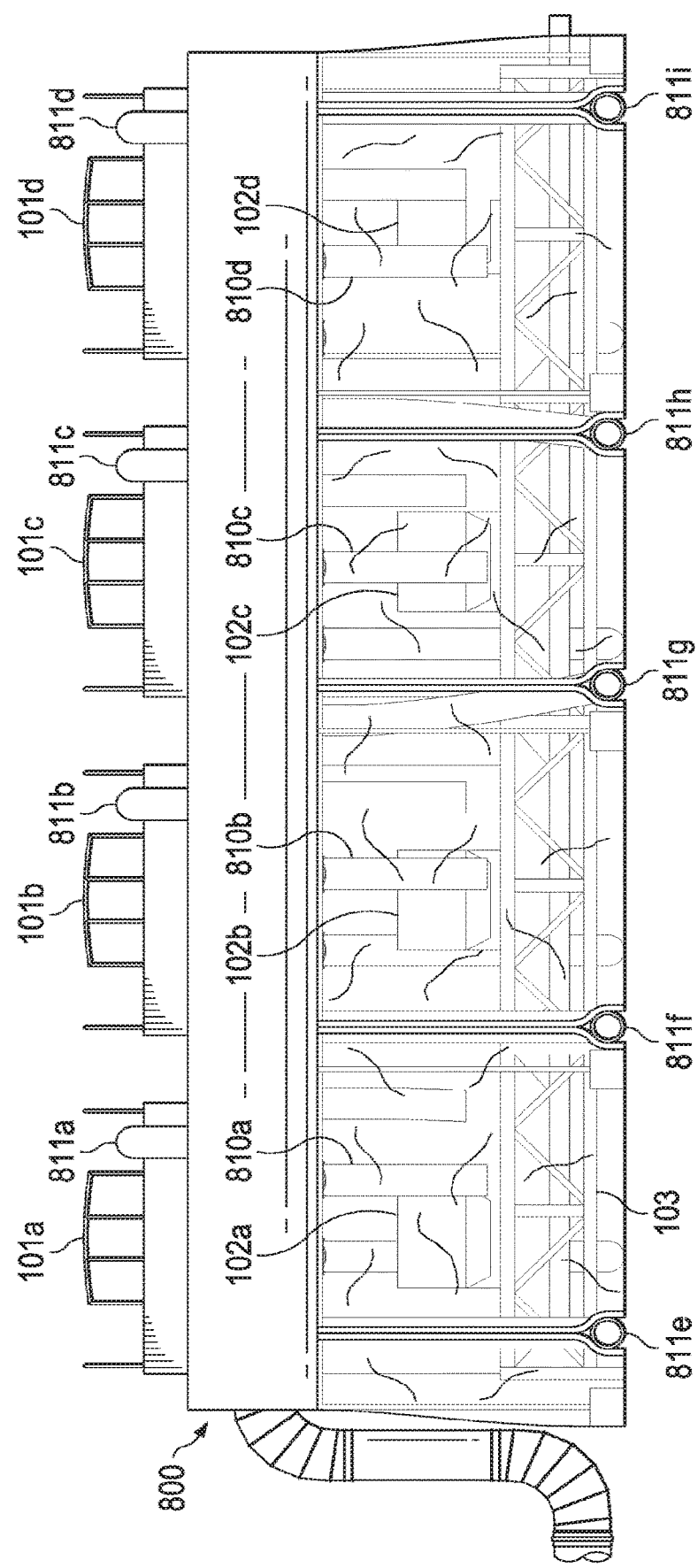
FIG. 8E is a side elevational view diagram showing a representative use of the raised manifold and enclosure system of FIGS. 8A-8D in the system of FIG. 1, wherein the lateral conveyor is enclosed and flexible conduits attached to the raised manifold collect dust generated at points along the lateral conveyor and from within the sand transportation and storage containers.

In FIG. 8E, raised manifold 800 and enclosure 814 of FIG. 8D are shown in use with an embodiment of frac sand transportation, storage, and unloading system 100 of FIG. 1 including four (4) transportation and storage containers 101a-101d coupled to four (4) corresponding remote flexible conduits 811a-811d extending from the bottom edge 815 of the opposing side of enclosure 814. Remote conduits 811e-811i extending from the bottom edge 815 of the facing side of enclosure 814 may be used for collecting dust at other points within system 100, such as along lifting conveyor section 105 or from within additional sand storage and transportation containers (see FIG. 8H).

In the example of FIG. 8E, at least four (4) local conduits 810a-810d extend downward within enclosure 814 from raised manifold 800 to collect dust generated from the discharge of sand from four (4) container conveyors (stingers) 102a-102d to lateral conveyor section 103. Preferably, in configurations where manifold 800 is generally located above lateral conveyor section 103, such as those shown in FIGS. 8E and 8G, manifold 800 is also located above the discharge end of trailer discharge conveyors 102, as well.

Figure 8F:
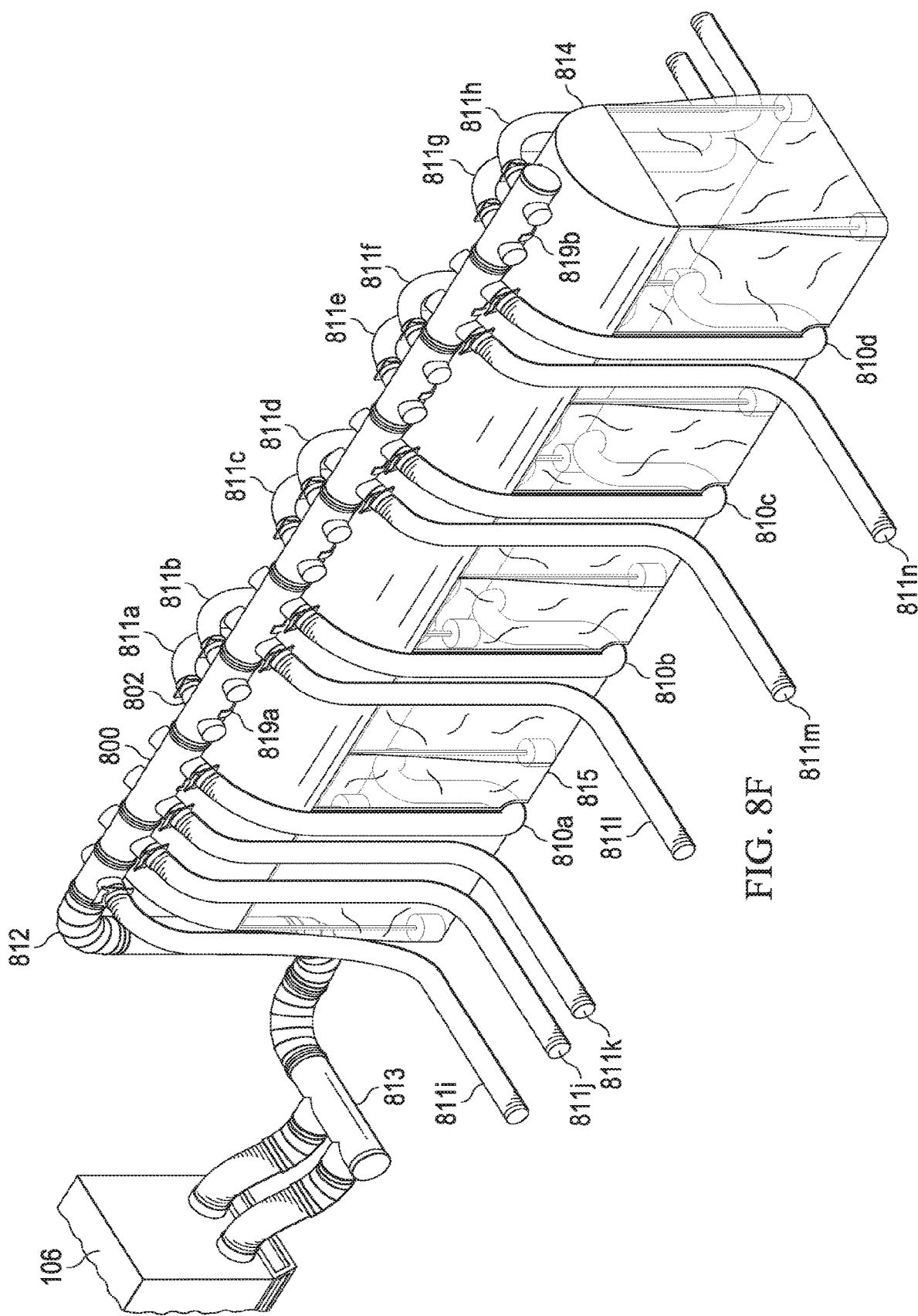
FIG. 8F is a perspective view diagram of an alternative raised manifold and enclosure system according to the principles of the present invention, which is suitable for use in a frac sand silica dust control system such as that shown in FIG. 1.

FIG. 8F illustrates an alternative system configuration in which raised manifold 800 is supported above support frame 801 and outside of enclosure 814. In this configuration, local conduits 810 run generally down the sidewalls of enclosure 814, extend underneath enclosure edge 815 or through apertures near enclosure edge 815, and then extend further within enclosure 814 to the corresponding dust collection points. Alternatively, local conduits 810 could enter the interior of enclosure 814 at different points, such as through one or both of the enclosure sidewalls or through the enclosure roof.

In the supported configuration of FIG. 8F, raised manifold 800 is supported by periodically spaced u-shaped cradles 819, two of which are shown at 819a and 819b for reference. Cradles 819 are fastened to central upper longitudinal reinforcing member 805 of support frame 801, for example, by bolts or pins. Alternatively, raised manifold 800 could be directly fastened to upper longitudinal reinforcing member 805 or fastened to support structure 801 using another technique. Furthermore, while raised manifold 800 is shown positioned along the centerline generally defined by central upper longitudinal reinforcing member 805, it could be laterally and/or vertically displaced from the centerline in alternative embodiments.

Figure 8G:
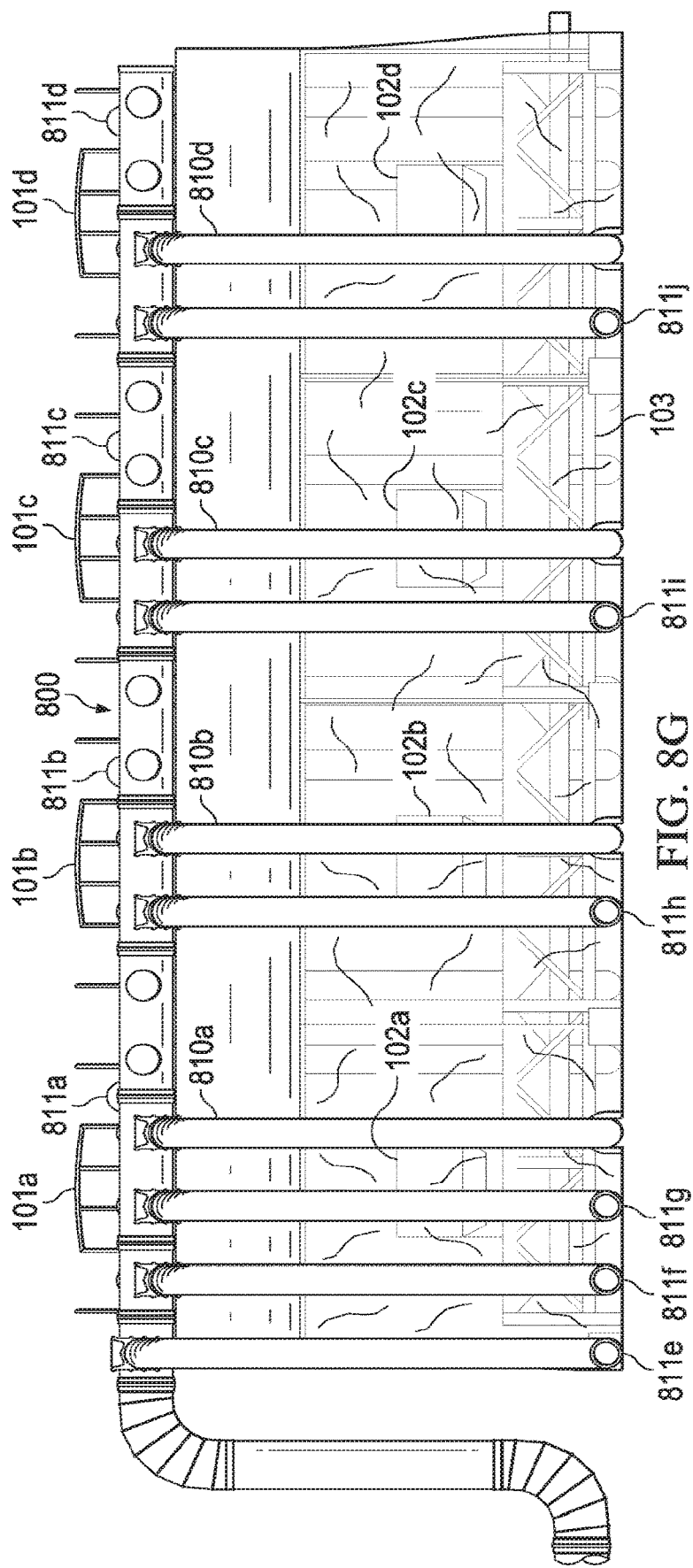
FIG. 8G is a side elevational view diagram showing a representative use of the raised manifold and enclosure system of FIG. 8F in the system of FIG. 1, wherein the lateral conveyor is enclosed and flexible conduits collect dust generated along the lateral conveyor and from within the transportation and storage containers.

In FIG. 8G, the supported configuration of raised manifold 800 and enclosure 814 are shown in use with an embodiment frac sand transportation, storage, and unloading system 100 of FIG. 1 including four (4) transportation and storage containers 101a-101d coupled to four (4) corresponding remote flexible conduits 811a-811d coupled to corresponding fittings 802 on the opposing side of raised manifold 800. Remote conduits 811e-811j extending from fittings 802 on the facing side of enclosure 814 may be used for collecting dust at other points within system 100, such as along lifting conveyor section 105 or from within additional sand storage and transportation containers.

In the example of FIG. 8G, at least four (4) local conduits 810a-810d extend downward outside of the sidewall of enclosure 814, extend underneath enclosure edge 815 or through apertures near enclosure edge 815, and then extend upward within cover 814 to collect dust generated from the discharge of sand from four (4) container conveyors (stingers) 102a-102d to lateral conveyor section 103.

Figure 8H:
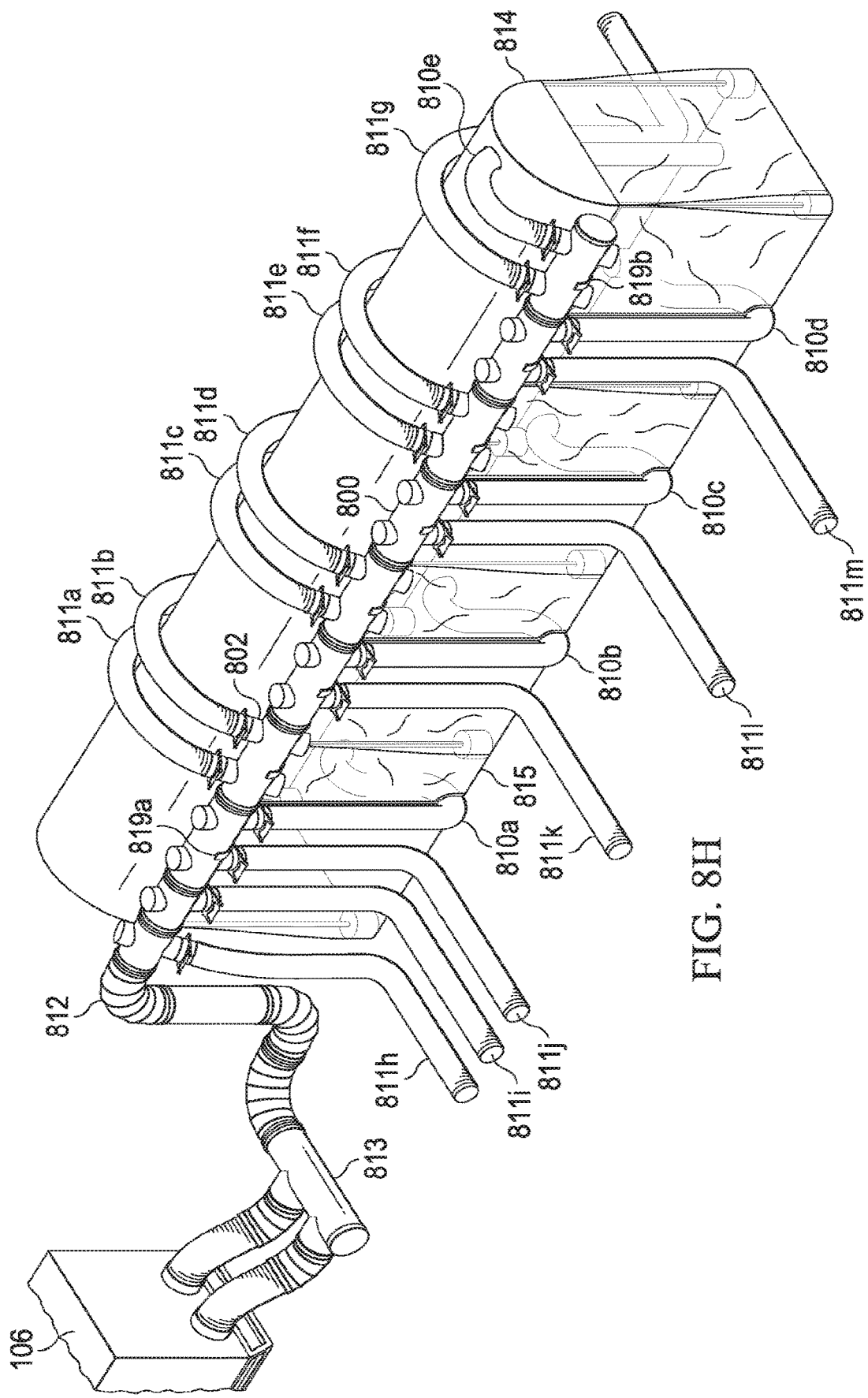
FIG. 8H is a perspective view diagram of another alternative raised manifold and enclosure system according to the principles of the present invention, which is suitable for use in a frac sand silica dust control system such as that shown in FIG. 1.

An alternative configuration is shown in FIG. 8H, where manifold 800 remains outside of enclosure 814 and is supported by support structure 801, but is now located lower down the side of the support structure 801. While manifold 800 is shown generally at the point where U-shaped support members 808 transition from a curve to vertical support members, manifold 800 can be placed at any point between the very top of support structure 801 (FIGS. 8F and 8G) and the ground. In addition, manifold 800 can be positioned on either side of support structure 801, as need for a particular worksite or dust control system configuration.

In the embodiment of FIG. 8H, manifold 800 is preferably secured directly to support frame 801 by bolts, pins, or a similar fastening technique. Remote flexible conduits 811 then extend over the upper curved portion of support structure 801 and enclosure 814. In some embodiments, flexible conduits 810 could extend through the top portion (roof) of enclosure 814 to capture dust within the enclosure interior. Local flexible conduit 810e is an example of a flexible conduit extending through the top portion of enclosure 814.

Figure 8I:
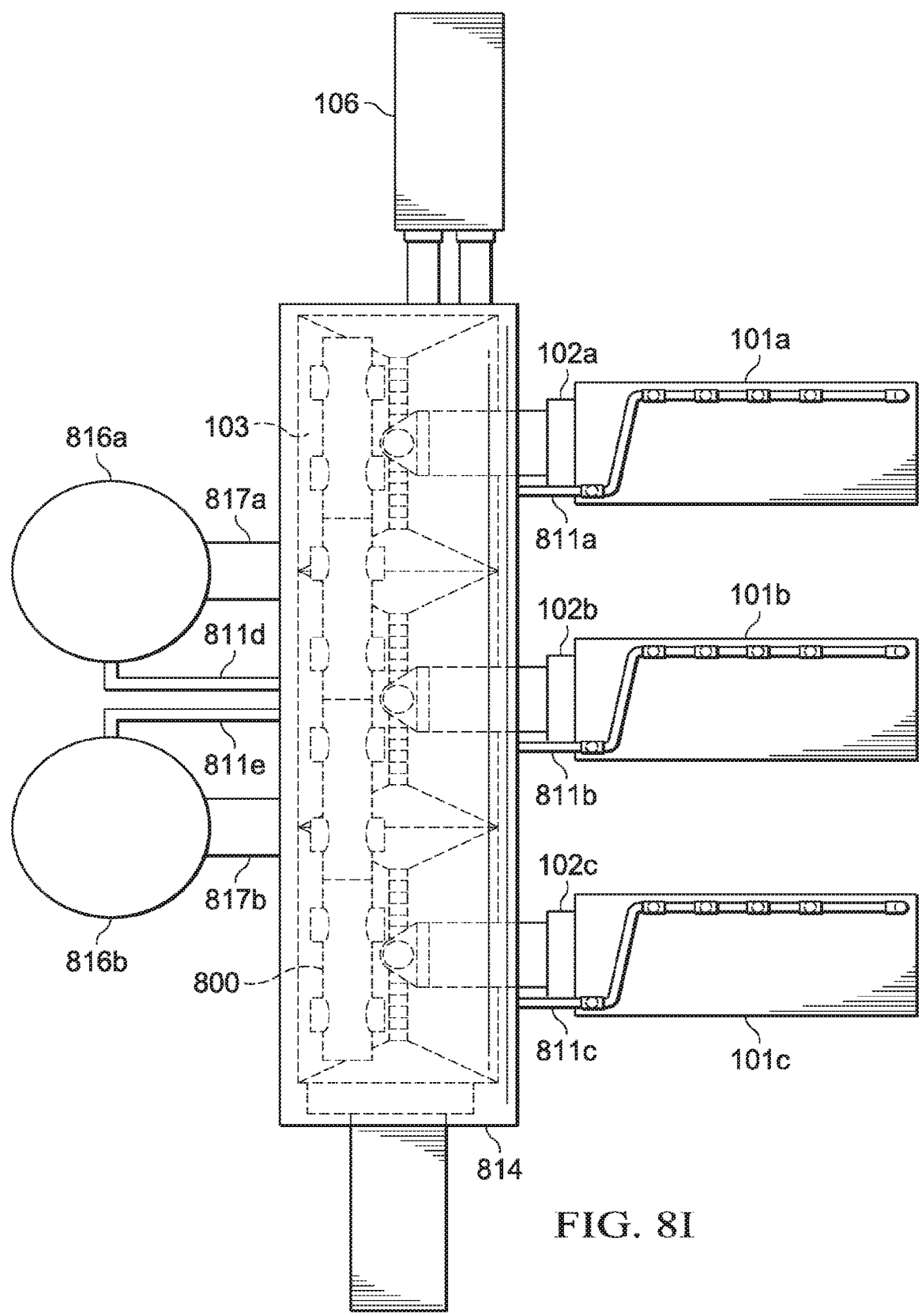
FIG. 8I is a top plan view diagram of an alternative sand transportation and unloading system including a frac sand silica dust control system using the raised manifold and enclosure system of FIGS. 8A-8D.

FIG. 8I illustrates an example in which remote conduits 811 extend from both sides of raised manifold 800. In this example, raised manifold 800 is shown in the configuration of FIGS. 8A-8E, although the same principles apply to the configuration shown in FIGS. 8F-8G. Here, three (3) remote conduits 811a-811c service three (3) sand transportation and storage containers 101a-101c and two (2) remote conduits 811d-811e service two (2) portable silos or vertical sand movers 816a-816b. (The number of sand sources, such as transportation and storage containers 101 and portable silos/vertical sand movers 816 may vary in actual practice.) Within enclosure 814, at least one local flexible conduit 810 or extended fitting 802 collects dust generated around each of the sand discharge points from trailer conveyors 102a-102b and the sand discharge points from portable silo chutes 817a-817b.

The principles of the present invention are also embodied in a raised manifold and enclosure system more specifically adapted for containing and collecting dust generated in and around the bin and tub of blender 119. One such system is shown in FIG. 9A, which includes a raised manifold 900 suspended below a support structure 901 by a set of straps or cables, two of which are shown at 910a and 910b for reference. Preferably, the construction of support structure 901 and straps/cables 910 are similar to those of support structure 801 and straps/cables 804 discussed above, although that is not a strict requirement of practicing the inventive principles. Support structure 901 also supports an enclosure 907, which is preferably similar in construction to enclosure 814 discussed above.

In the embodiment shown in FIG. 9A, raised manifold 900 includes a set of fittings, such as fittings 902a and 902b, which are in fluid communication with the interior passage through raised manifold 900. Similar to fittings 802 discussed above, fittings 902 provide a plurality of ports into raised manifold 900 for capturing dust when negative air pressure (i.e., suction) is applied to manifold 900, for example, by air unit 106 in embodiments of system 100. Each fitting 902 is associated with an air flow control device, which could be a gate, butterfly valve, ball valve, or similar device, controls air flow control through the corresponding fitting 902. (Air flow control preferably extends from a complete airflow shut-off to a maximum allowable flow through the given fitting 902 under the given system operating conditions.) In the illustrated embodiment, sliding gates 903a and 903b are shown as an example. While four (4) fittings 902 are shown in the exemplary embodiment of FIG. 9A, the number of fittings 902 may vary in actual applications, depending on the dust-capture requirements.

Fittings 902 can be used unmodified (e.g., without a flexible conduit or rigid extension), with a rigid extension, or in conjunction with a flexible conduit or rigid extension. Unmodified or extended fittings 902 are particularly suitable for capturing dust contained within enclosure 907. Fittings 902 connected to flexible conduits are suitable for capturing dust at one or more points within enclosure 907, as well as one or more points outside of enclosure 907. Not all fittings 902 need be used and unused fittings 902 can be shut-off using the corresponding sliding gates 903.

The construction of raised manifold 900 is preferably similar to that of raised manifold 800 discussed above. As with raised manifold 800, characteristics such as shape, fabrication material, degree of rigidity, and so on, may vary from embodiment to embodiment of the present inventive principles.

As shown in FIG. 9A, all four (4) exemplary fittings 902 are coupled to a corresponding set of four (4) flexible conduits. Two (2) fittings 902 are connected to local flexible conduits 904a and 904b, which extend downward within cover 907 for capturing dust in the areas around the bin and tub of blender 119 (see FIG. 9E). In addition, two other fittings 902 are coupled to remove flexible conduits 905a-905b, which extend under the bottom edge 909 or through an aperture close to bottom edge 909 of enclosure 900. Remote flexible conduits 905 may be used to capture dust at other points around a frac sand storage and movement system, for example, dust within a trailer 101, dust generated along lateral conveyor system 103, or dust generated along angled lifting conveyor 105 of an embodiment of system 100 of FIG. 1. In alternative embodiments, remote flexible conduits 905 could exit enclosure 907 at different points, including points higher up on the sidewalls of enclosure 907 or through the enclosure 907 roof.

A elbow-shaped conduit 906 couples raised manifold 900 to an air system 106, which is similar to those discussed above. In one particular configuration shown in FIGS. 9B and 9C, rigid elbow-shaped conduit 906 communicates with an air system 106 through a manifold system 908 formed of both rigid and flexible sections of conduits, although other configurations may be used in alternative embodiments. For example, air system 106 could be connected either to elbow-shaped conduit 906 or directly to raised manifold 900 through a flexible conduit or conduit.

Figure 9B:
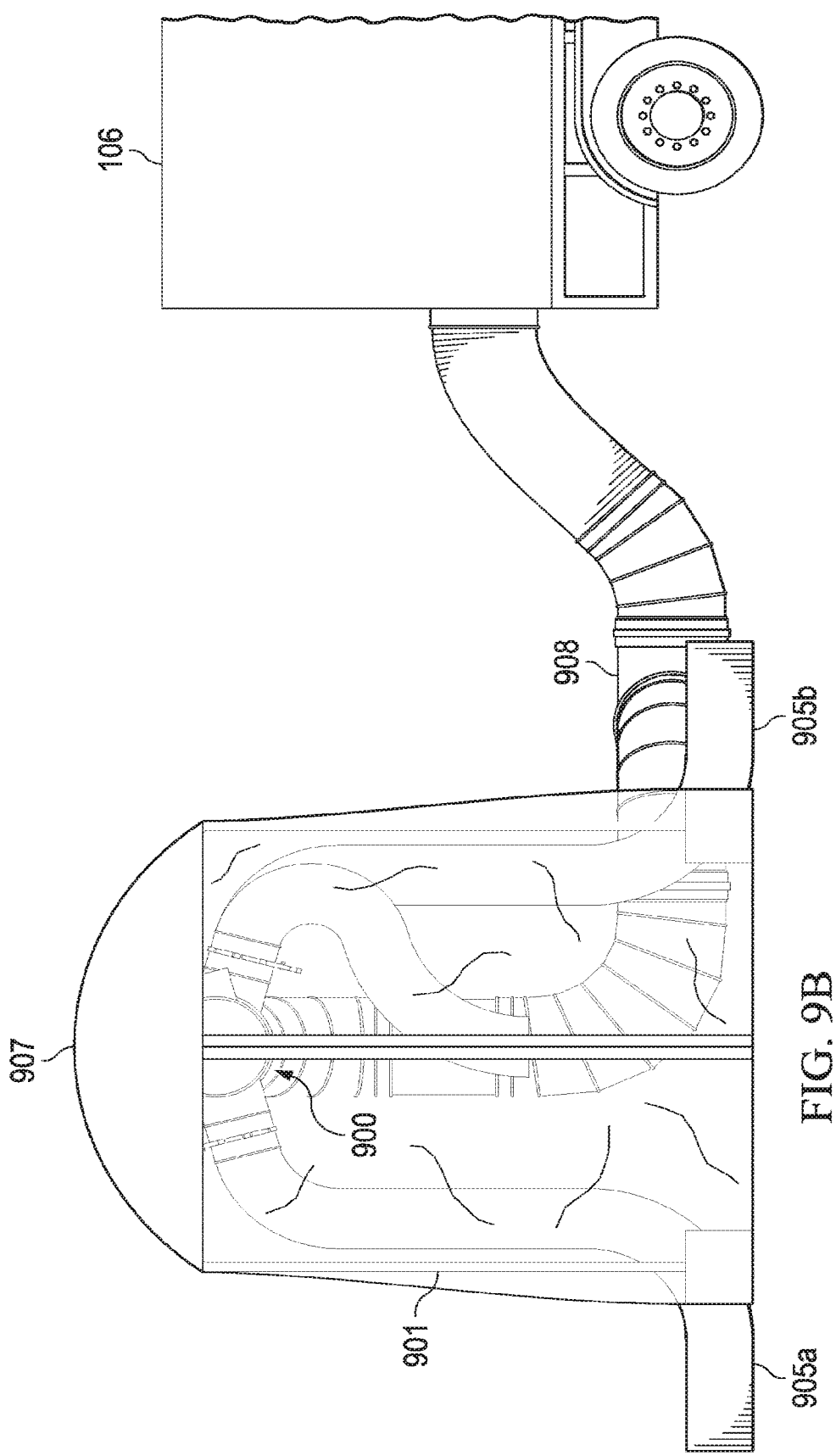
FIG. 9B is an end elevational view diagram of the raised manifold and enclosure system shown in FIG. 9A, as connected to an air system such as that shown in FIG. 1.
Figure 9C:
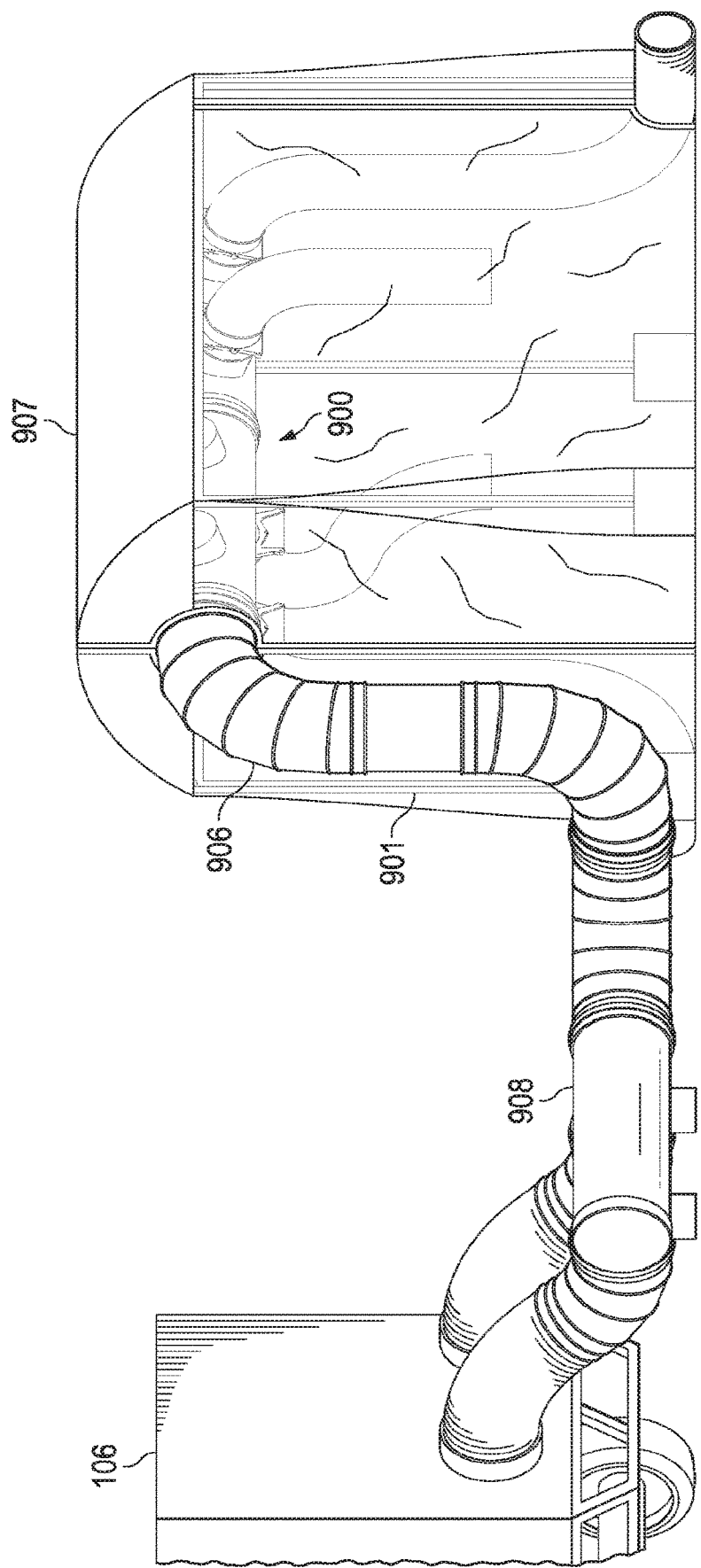
FIG. 9C is a perspective view diagram of the raised manifold and enclosure system of FIGS. 9A-9B, shown connected to an air system such as that shown in FIG. 1.
Figure 9D:
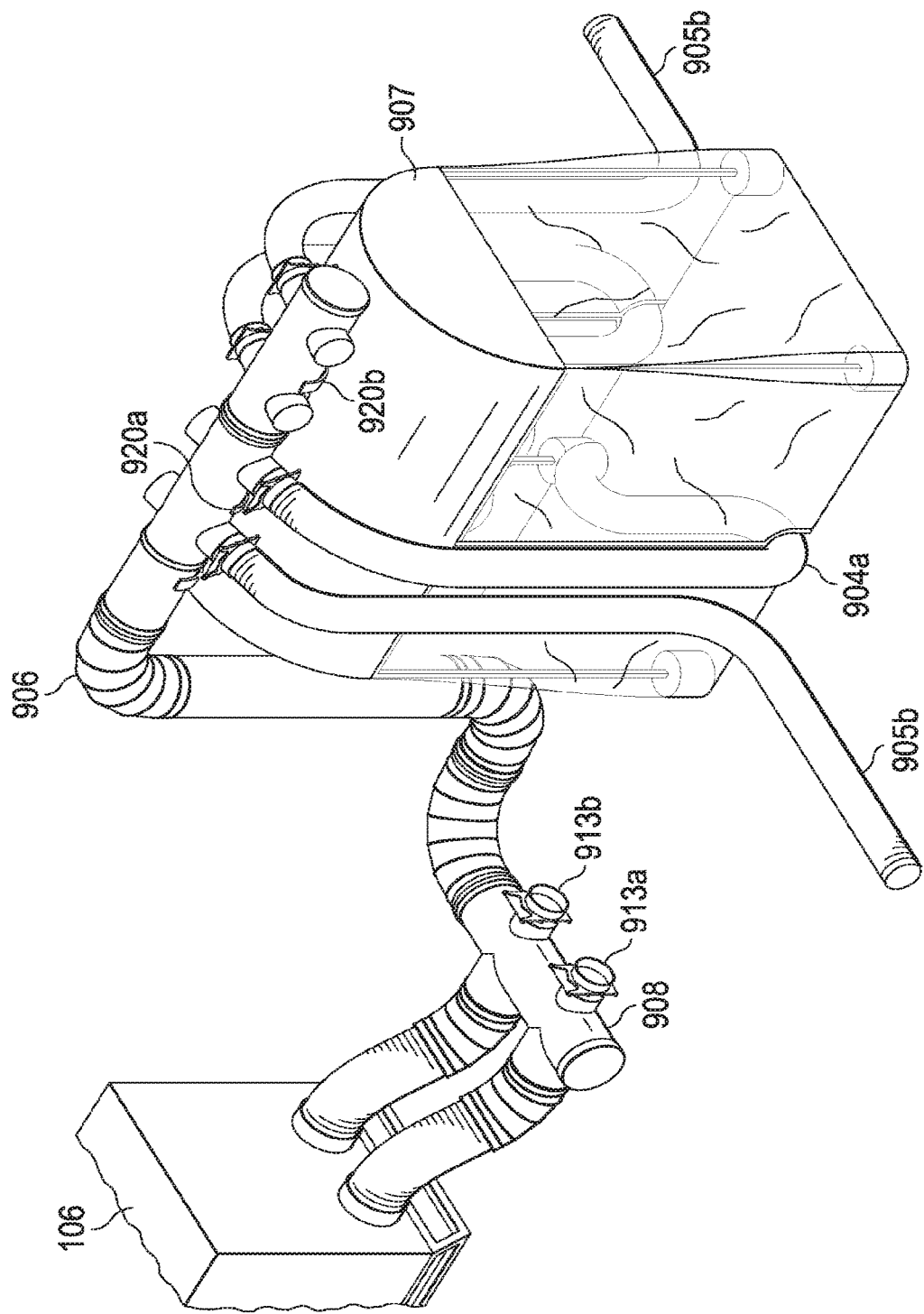
FIG. 9D is a perspective view diagram of a further alternative raised manifold and enclosure system according to the inventive principles, as connected to an air system such as that shown in FIG. 1.

FIG. 9D shows an alternative configuration where raised manifold 900 is supported above the roof of enclosure 907 by frame 901 and u-shaped cradles 920a-920b. In this configuration, local conduits 904 run generally down the sidewalls of enclosure 907, extend underneath enclosure edge 909 or through apertures near enclosure edge 909, and then extend further within enclosure 907 to the corresponding dust collection points. Alternatively, local conduits 904 could enter the interior of enclosure 907 through one or both of the enclosure sidewalls or through the roof. In addition, while cradles 920 are shown as u-shaped in the illustrated embodiment, different cradle shapes may be used in alternate embodiments.

Figure 9E:
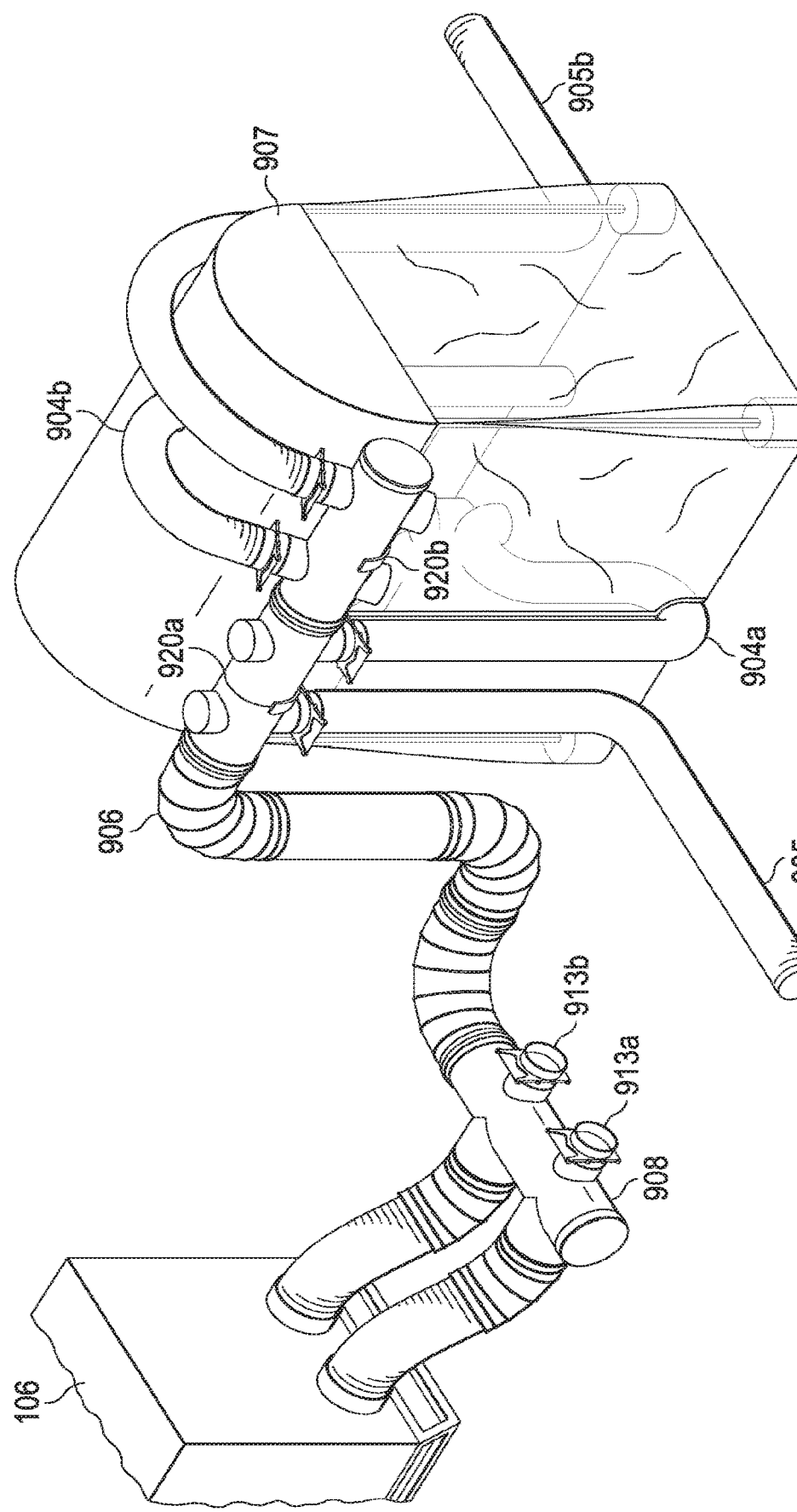
FIG. 9E is a perspective view diagram of an additional alternative raised manifold and enclosure system according to the inventive principles, as connected to an air system such as that shown in FIG. 1.

A further alternative configuration is shown in FIG. 9E, where manifold 900 remains outside of enclosure 907 and is supported by support structure 901, but is now located lower down the side of the support structure 901. While manifold 900 is shown generally at the point where support structure 901 transitions from a curve to vertical support members, manifold 900 can be placed at any point between the very top of support structure 901 (FIG. 9D) and the ground. In addition, manifold 900 can be positioned on either side of support structure 901, as need for a particular worksite or dust control system configuration. FIG. 9D also shows optional fittings/air flow control assemblies 913a-913b, which allow additional local or remote flexible conduits to be connected directly with manifold system 908.

In the embodiment of FIG. 9D, manifold 900 is shown supported by a set of cradles 920a-920b extending outwardly from support frame 901, although manifold 900 could also be secured directly to support frame 901 by bolts, pins, or a similar fastening technique. Remote flexible conduits, such as remote flexible conduit 905b, can then extend over the upper curved portion of support structure 901 and enclosure 907. In some embodiments, one or more local flexible conduits 904, such as local flexible conduit 904b, could extend through the top portion of enclosure 907 to capture dust within the enclosure interior.

Figure 9F:
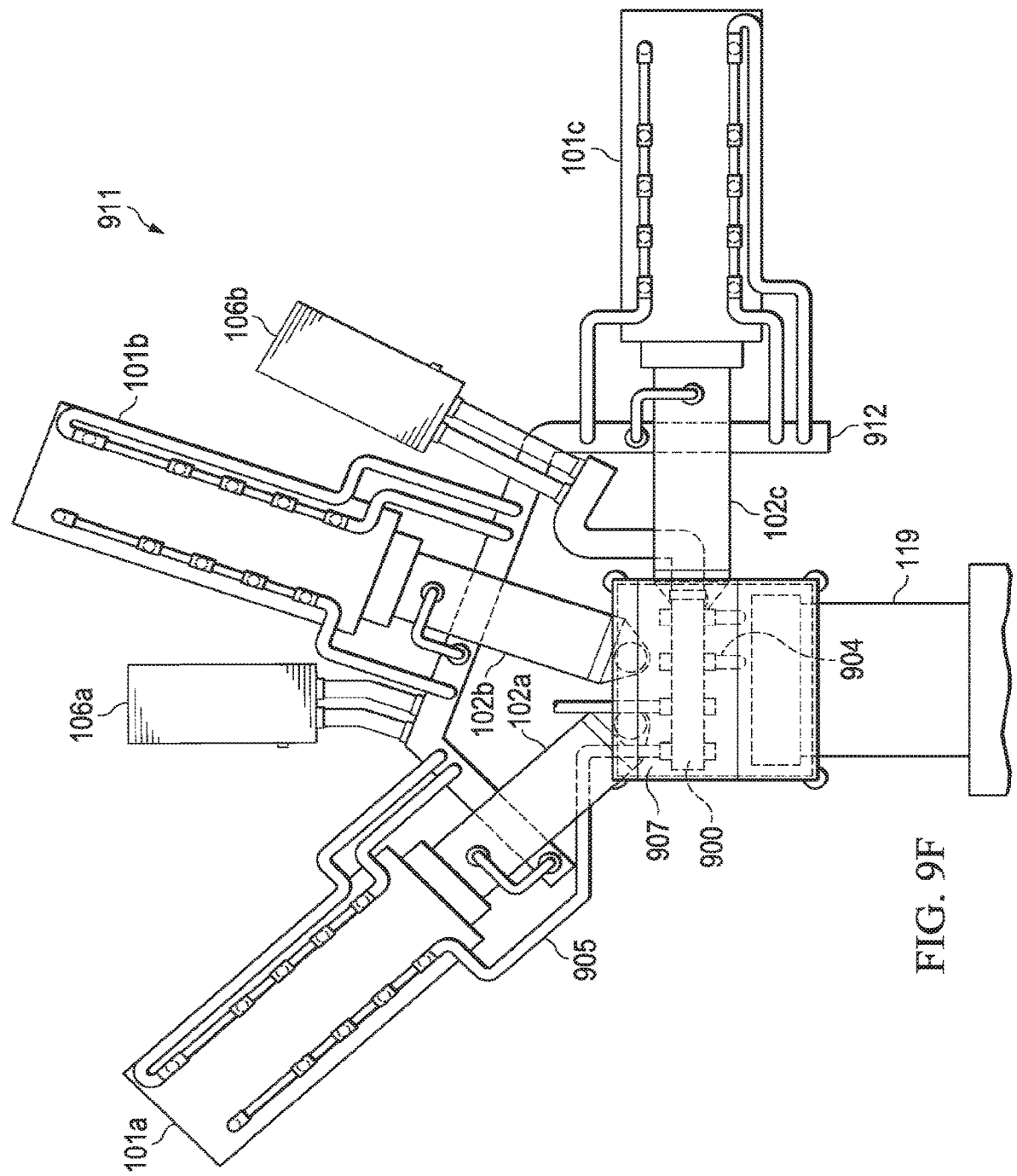
FIG. 9F is a top plan view diagram of an alternative sand transportation and unloading system including a frac sand silica dust control system using the raised manifold and enclosure system of FIGS. 9A-9C.

FIG. 9F illustrates an alternative frac sand transportation, storage, and unloading system 911 including a frac sand silica dust control system suitable for use with either of the configurations of raised manifold 900 shown in FIGS. 9A and 9D. Preferably, enclosure 907 encloses the bin, the tub, or both the bin and tub of blender 119. In FIG. 9F, enclosure 907 encloses both the blender bin and the blender tub, as generally shown in broken lines. At least one fitting 902, which may be unmodified, extended, or connected to a local flexible conduit 904, as shown in FIG. 9F, collects dust contained by enclosure 907.

In the system of FIG. 9F, the container conveyors (stingers) 102a-102c associated with trailers 101a-101b extend through apertures in the sidewalls of enclosure 907 and discharge sand directly into the bin of blender 119. Preferably, manifold 900 is located above the discharge end of container conveyors 102a-102c (or in embodiment using one or more silo chutes, above the discharge ends of the silo chutes). In addition, FIG. 9E provides an example where two (2) manifolds and two (2) air systems are used to collect dust at various points around the system.

Specifically, air system 106a and manifold 912 are used to collect dust within the compartments of trailers 101a-101b. Air system 106b and raised manifold 900 capture dust within enclosure 907, as well as provide a remote flexible conduit 905 for collecting dust within some of the compartments of trailer 101a. Raised manifold 900 and manifold 912 may also be coupled together to create a unified conduit system serviced by either or both of air systems 106a-106b.

FIG. 9F only shows one possible use of raised manifold 900. Raised manifold 900 can be used alone to collect dust around the bin and tub of a fracing blender, provide negative air pressure to one or more local flexible conduits 905 for collecting dust along a lateral conveyor, lifting conveyor, a container conveyor, or silo chute, and/or provide negative air pressure through one or more remote flexible conduits 905 for collecting dust within a sand trailer or portable sand silo. Raised manifold 900 may also be use in conjunction with raised manifold 800 and enclosure 814. Advantageously, when raised manifolds 800 are 900 are used in combination, a wide range of options are available for collecting dust around a given frac sand transportation, storage, and handling system.

In sum, the principles of the present invention provide for the efficient capture and removal of silica dust generated during the offloading of frac sand at a worksite. Silica dust removal is performed near, but not limited to, substantial sources of hazardous silica dust, including at trailer to trailer conveyor sand transfer point, each point of transfer from the trailer discharge conveyors and the lateral site conveyor, and points along the lifting/discharge conveyor. The embodiments of the inventive principles are scalable, and can be applied to any discharging system serving single or multiple frac sand storage trailers and can be implemented with various commercially available cyclone/baghouse silica dust removal systems. Moreover, the configuration and construction of these embodiments are also variable, allowing silica dust control to be effectively implemented under widely varying worksite conditions.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A system for controlling dust during hydraulic fracturing operations comprising:
    a conveyor adapted to transport sand from a sand source to a blender, the conveyor including a conveyor frame;
    an air system for providing suction;
    a manifold coupled to the air system;
    at least one conduit having a first end coupled to the air system through the manifold and a second end for capturing dust when suction is applied to the first end by the air system through the manifold; and
    a self-supporting cover system having a first portion and a second portion,
    the first portion of the cover system being adapted to enclose a lateral section of the conveyor disposed adjacent to the sand source, the first portion of the cover system comprising a set of first sidewalls supported by a first set of cover frames straddling the sides of the lateral conveyor section and having bases on the ground,
    wherein each cover frame of the first set of cover frames includes an upper section connected between a pair of spaced-apart vertical portions, the pair of vertical portions being adapted to straddle the lateral conveyor section, and wherein a lower end of each respective vertical portion is connected to, and supported by, a respective individual base configured to rest on the ground,
    wherein each respective individual base is directly connected to the lower end of the respective vertical portion and is not directly connected to any other individual base, any other vertical portion, or any other cover frame of the first set of cover frames, wherein each respective vertical portion is directly connected to the respective individual base and the respective upper section, and is not directly connected to any other individual base, any other vertical portion or any other cover frame of the first set of cover frames, and wherein the individual bases, vertical portions and upper section are unconnected to the lateral conveyor section;

the second portion of the cover system being adapted to enclose at least a portion of at least one of a blender bin and a blender tub, the second portion of the self-supporting cover system comprising a set of second sidewalls supported by a second cover frame based on the ground, wherein:

a discharge end portion of the conveyor extends through one of the second sidewalls such that a discharge end of the conveyor is disposed above at least a portion of the at least one of the blender bin and the blender tub; and wherein the manifold has a first portion and a second portion, the first manifold portion being supported by the first set of cover frames such that the first portion of the manifold is positioned above, and parallel to, the lateral conveyor section, and the second manifold portion being supported by the second cover frame above at least a portion of the at least one of the blender bin and the blender tub, and wherein the second manifold portion is displaced relative to a centerline of the second cover frame so as to accommodate the at least one of the blender bin and the blender tub; and the at least one conduit extends from the manifold such that the second end of the at least one conduit is disposed within the cover system above the discharge end of the conveyor and above the at least one of the blender bin and the blender tub.

2. The system of claim 1, wherein at least one of the set of first sidewalls or the set of second sidewalls is formed of flexible material.

3. The system of claim 1, wherein the discharge end of the conveyor comprises a spout.

4. A dust control system comprising:

a conveyor for transporting sand and including a conveyor frame and a discharge end;

an air system for generating a negative air pressure;

a manifold coupled to the air system and having a plurality of longitudinally spaced apart ports;

a self-supporting cover system including a cover frame and a plurality of flexible sidewalls supported on the frame and adapted to cover the discharge end of the conveyor and at least a portion of at least one of a blender bin and a blender tub;

the cover frame comprising a set of cover frame members, wherein each cover frame member includes an upper section connected between a pair of spaced-apart vertical portions, with a lower end of each respective vertical portion being connected to, and supported by, a respective individual base configured to rest on the ground, wherein each respective individual base is directly connected to the lower end of the respective vertical portion and is not directly connected to any other individual base, any other vertical portion, or any other cover frame member of the cover frame, wherein each respective vertical portion is directly connected only to the respective individual base and the respective upper section, and is not directly connected to any other individual base, any other vertical portion or any other cover frame member of the cover frame, and wherein the individual bases, vertical portions and upper section are unconnected to the conveyor, conveyor frame, and the at least one of the blender bin and the blender tub;

wherein the cover frame straddles the conveyor such that the cover frame of the self-supporting cover system is unconnected to the conveyor or the conveyor frame and a portion of the conveyor extends through one of the flexible sidewalls such that the discharge end of the conveyor is disposed above at least a portion of the at least one of the blender bin and the blender tub, the manifold supported above the ground by the cover frame of the self-supporting cover system to be positioned above, and parallel to, the conveyor, and displaced relative to a centerline of the cover frame of the cover system so as to accommodate the at least one of the blender bin and the blender tub; and a plurality of hoses coupled to the air system by way of corresponding ports of the manifold and extending through a flexible sidewall of the self-supporting cover system into an interior of the self-supporting cover system for capturing dust within the interior of the self-supporting cover system when the negative air pressure is applied to the hoses by the air system, wherein an inlet of at least one of the hoses is disposed adjacent the discharge end of the conveyor and above a portion of the at least one of the blender bin and the blender tub.

5. The system of claim 4, wherein the hoses are flexible.

6. A system for processing sand during hydraulic fracturing comprising:

a source of sand;

a blender including a blending bin;

a conveyor for transporting sand from the source to the blender and having a conveyor frame and a discharge point over the blender bin;

a self-supporting enclosure including an enclosure frame that straddles the conveyor and the conveyor frame and a plurality of sidewalls supported on the enclosure frame and enclosing the blender bin and the discharge point of the conveyor, wherein the enclosure frame of the self-supporting enclosure comprises a set of enclosure frame members, wherein each enclosure frame member includes an upper section connected between a pair of spaced-apart vertical portions, with a lower end of each respective vertical portion being connected to, and supported by, a respective individual base configured to rest on the ground, wherein each respective individual base is directly connected to the lower end of the respective vertical portion and is not directly connected to any other individual base, any other vertical portion, or any other enclosure frame member of the enclosure frame, wherein each respective vertical portion is directly connected to the respective individual base and the respective upper section, and is not directly connected to any other individual base, any other vertical portion or any other enclosure frame member of the enclosure frame, and wherein the individual bases, vertical portions and upper sections are unconnected to the conveyor or the conveyor frame and wherein a portion of the conveyor extends through one of the sidewalls such that the discharge end of the conveyor is disposed above at least a portion of the blender bin;

an air system for generating negative air pressure;

a manifold coupled to the air system and at least partially supported above the ground and above the conveyor and parallel to the conveyor by the enclosure frame of the self-supporting enclosure, wherein the manifold includes a plurality of longitudinally spaced apart ports, and wherein the manifold is displaced relative to a centerline of the enclosure frame to accommodate the blender bin; and a plurality of hoses, each hose being coupled to the air system through a corresponding one of the ports of the manifold for capturing dust within the self-supporting enclosure when negative air pressure is applied by the air system, wherein at least one of the plurality of hoses extends through a sidewall of the self-supporting enclosure such that an inlet of the at least one hose is disposed above the discharge end of the conveyor and above a portion of the blender bin.

7. The system of claim 6, wherein the conveyor comprises a spout having an outlet forming the discharge point over the blender bin.

8. The system of claim 6, wherein the plurality of sidewalls of the self-supporting enclosure are formed from at least one piece of flexible material.

9. The system of claim 6, wherein the conveyor comprises an upwardly-angled conveyor section of a conveyor system comprising the upwardly-angled conveyor section and a lateral conveyor section.

10. The system of claim 6, wherein the conveyor directly transports sand from the source to the blender.

* * * * *